United States Patent [19]
Azibert et al.

[11] Patent Number: 6,068,263
[45] Date of Patent: May 30, 2000

[54] SPLIT MECHANICAL FACE SEAL WITH RESILIENT PIVOTING MEMBER

[75] Inventors: Henri V. Azibert, Windham, N.H.; Bo Ruan, Malden, Mass.; Shifeng Wu; Marlen S. Clark, both of Newburyport, Mass.

[73] Assignee: A.W. Chesterton Company, Stoneham, Mass.

[21] Appl. No.: 08/992,613

[22] Filed: Dec. 17, 1997

[51] Int. Cl.[7] .................................................. F16J 15/38
[52] U.S. Cl. ...................... 277/370; 277/377; 277/382; 277/399; 277/401
[58] Field of Search .................................... 277/401, 408, 277/399, 387, 388, 370, 377, 382

[56] References Cited

U.S. PATENT DOCUMENTS

| | | |
|---|---|---|
| 2,928,685 | 3/1960 | Tracy . |
| 3,272,519 | 9/1966 | Voitik . |
| 3,486,760 | 12/1969 | Tracy . |
| 3,498,620 | 3/1970 | Wiese . |
| 3,526,408 | 9/1970 | Tracy . |
| 3,589,738 | 6/1971 | Tracy . |
| 3,917,289 | 11/1975 | Ivanov et al. . |
| 3,948,530 | 4/1976 | Gyory . |
| 4,196,911 | 4/1980 | Matsushita . |
| 4,323,255 | 4/1982 | Wiese . |
| 4,438,936 | 3/1984 | Schlegel . |
| 4,447,063 | 5/1984 | Kotzur et al. . |
| 4,576,384 | 3/1986 | Azibert . |
| 4,643,437 | 2/1987 | Salant et al. . |
| 4,691,276 | 9/1987 | Miller et al. . |
| 4,722,534 | 2/1988 | Wentworth . |
| 4,749,199 | 6/1988 | Gresh . |
| 4,779,876 | 10/1988 | Novosad . |
| 5,014,999 | 5/1991 | Makhobey . |
| 5,039,113 | 8/1991 | Gardner . |
| 5,052,694 | 10/1991 | Lipschitz . |
| 5,114,163 | 5/1992 | Radosav et al. . |
| 5,143,384 | 9/1992 | Lipschitz . |
| 5,199,720 | 4/1993 | Radosav et al. . |
| 5,333,882 | 8/1994 | Azibert et al. . |
| 5,344,164 | 9/1994 | Carmody et al. . |
| 5,370,401 | 12/1994 | Sandgren . |
| 5,725,220 | 3/1998 | Clark et al. . |
| 5,762,342 | 6/1998 | Kakabaker et al. . |
| 5,769,427 | 6/1998 | Ostrowski . |
| 5,820,129 | 10/1998 | Reagan . |

FOREIGN PATENT DOCUMENTS 0 658 714 A1   6/1995   European Pat. Off. .

*Primary Examiner*—Anthony Knight
*Assistant Examiner*—Alison K. Pickard
*Attorney, Agent, or Firm*—Lahive & Cockfield, LLP

[57] ABSTRACT

A split mechanical face seal that provides fluid sealing between a housing and a rotating shaft includes first and second seal rings each having at least two seal ring segments and a radially extending seal surface. The seal ring surfaces of the seal rings are opposed to one another. One of the seal rings is connected to the rotating shaft to rotate therewith, while the other seal ring is connected to the housing. The split seal also includes a mechanism for introducing a fluid to the seal surfaces of the first and second seal rings. The seal further is provided with a system for maintaining co-planar alignment of the seal faces.

52 Claims, 13 Drawing Sheets

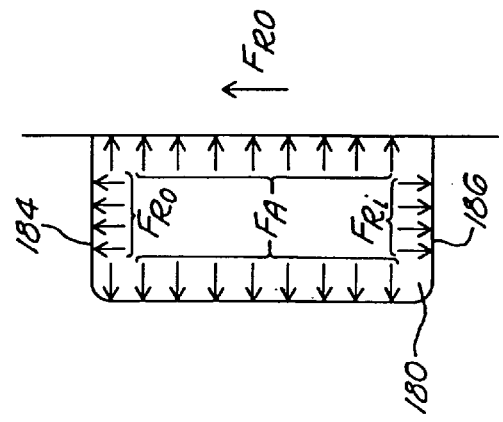
FIG. 13
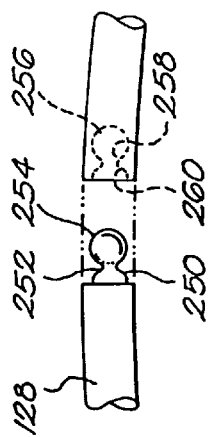
FIG. 14
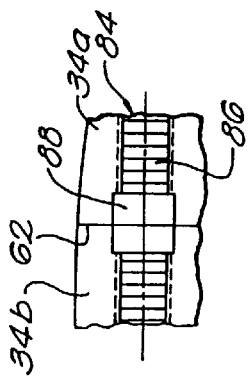
FIG. 18
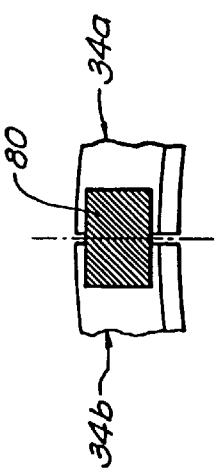
FIG. 7B
FIG. 7A
FIG. 8

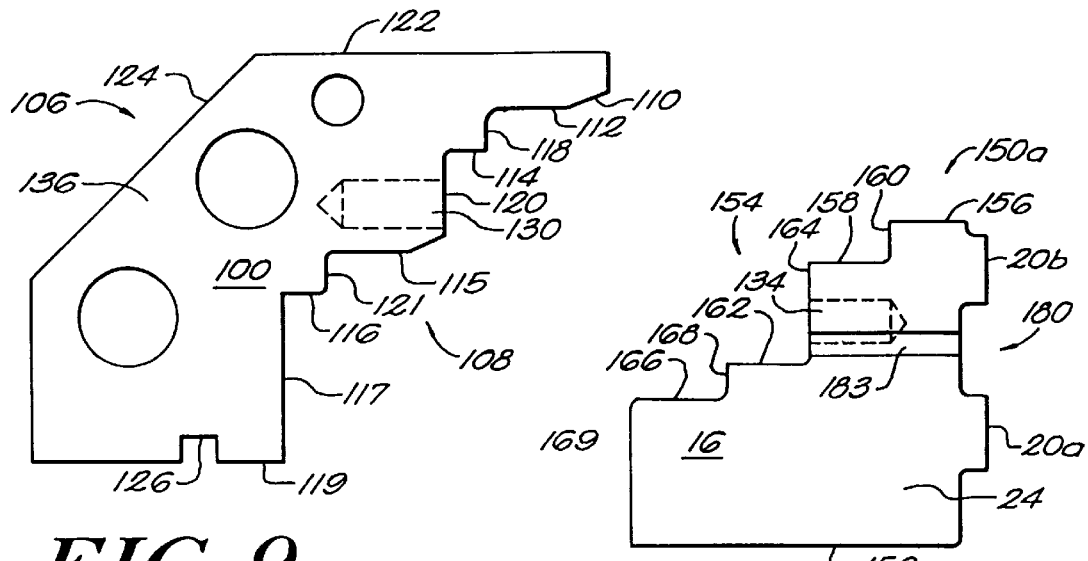
FIG. 9
FIG. 10
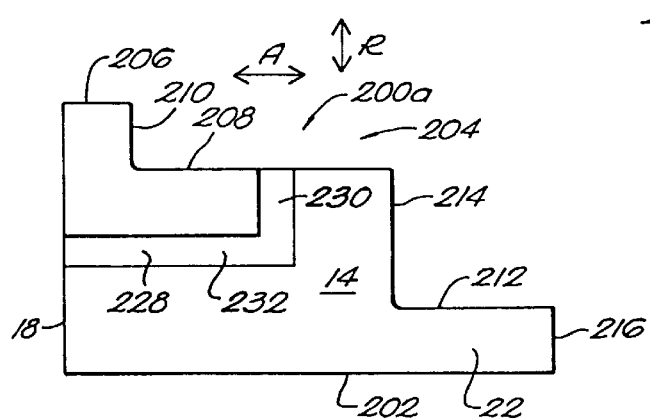
FIG. 11
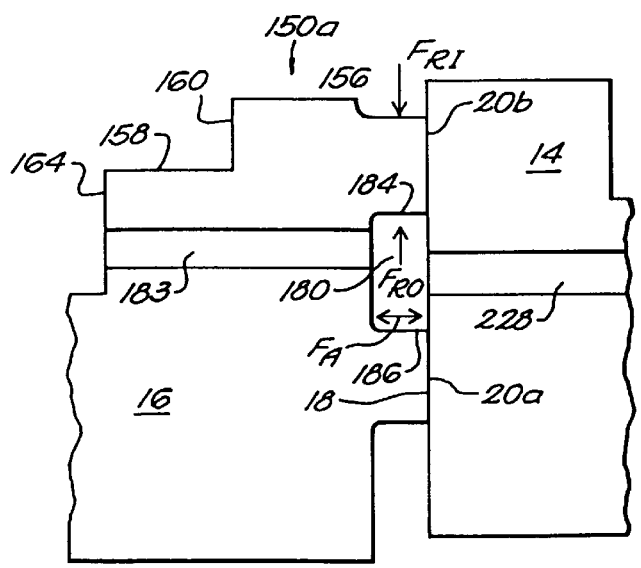
FIG. 12

SPLIT MECHANICAL FACE SEAL WITH RESILIENT PIVOTING MEMBER

BACKGROUND OF THE INVENTION

The present invention relates generally to seals for providing fluid sealing between a housing and a rotating shaft. More particularly, the invention relates to face seals in which a fluid is introduced between portions of the seal faces of the seal.

Conventional mechanical seals are employed in a wide variety of mechanical apparatuses to provide a pressure-tight and fluid-tight seal between a rotating shaft and a stationary housing. The seal is usually positioned about the rotating shaft, which is mounted in and protrudes from the stationary housing. The seal is typically bolted to the housing at the shaft exit, thus preventing loss of pressurized process fluid from the housing. Conventional split mechanical seals include face type mechanical seals, which include a pair of annular sealing rings that are concentrically disposed about the shaft, and axially spaced from each other. The sealing rings each have sealing faces that are biased into physical contact with each other. Usually, one seal ring remains stationary, while the other ring contacts the shaft and rotates therewith. The mechanical seal prevents leakage of the pressurized process fluid to the external environment by biasing the seal ring sealing faces into physical contact with each other. As a result of the repeated physical contact between the faces, abrasion of the seal faces occurs and the seals typically exhibit undesirable wear characteristics and leakage.

The poor wear characteristics of these conventional mechanical face seals necessitate the frequent monitoring and replacement of the seal components, particularly the seal rings. Replacement and repair of damaged seals have been facilitated by seal designs where a portion of the component parts of the mechanical seals are segmented or split. Installation of split or partially split seal components can be performed without necessitating the complete breakdown of the mechanical apparatus and without having to pass the annular seal over an end of the shaft. However, even in split seal designs, significant time is required to replace the seal components, resulting in frequent long periods of down time for the mechanical apparatuses associated with the seal.

The prior art attempted to overcome the above difficulties by employing non-contact mechanical seals that utilize a fluid interposed between the seal ring faces to reduce frictional wear. Conventional mechanical non-contact face seals typically employ spiral type-grooves formed in the hard face of the seal rings to develop a hydrodynamic lifting force that separates the seal faces. The resultant gap allows fluid to be disposed within the gap to prevent abrasion of the seal faces. These types of seals are limited in application because the seals are designed to operate in a unidirectional manner. If the seals are driven in the opposite direction, the seal rings typically do not separate but are pulled or sucked toward each other, thereby increasing wear and ultimately destroying the seals. Other conventional designs employ specially designed spiral grooves that can operate in both directions (bi-directional grooves). These grooves, however, are typically less efficient in separating the seal faces.

Even in mechanical non-contact seal designs a certain amount of seal face abrasion occurs, especially during start-up or during periods in which the shaft is rotating at relatively low speeds. Such abrasion causing wear of the seal components requires the eventual replacement of the seal components.

Few, if any, split-seal designs have been proposed for non-contacting seals. Difficulties have occurred in developing such a seal design due to the increased number of sealing surfaces in a split seal design and the presence of the fluid between the seal faces. The additional seal surfaces between each of the split segments of the seal components, and especially between the seal ring segments, make it difficult to maintain a fluid tight seal throughout the split seal. In addition, the fluid interposed between the seal faces can exert separation forces on the split seal components which can cause separation of the split components and further fluid leakage. For these reasons, there is a need in the art for a split, non-contact mechanical seal design that can provide a fluid-tight seal, while concomitantly providing the advantage of conventional split-seal designs.

As the above described and other prior art seals have proved less than optimal, an object of the present invention is to provide an improved split mechanical seal in which a fluid can be introduced between the seal faces while maintaining a relatively fluid-tight seal.

Another object of the invention is to provide a split mechanical seal operable under a wide range of operating conditions for a wide range of services.

Still another object of the present invention is to provide a split mechanical seal that is relatively easy to assemble or and to disassemble.

Yet another object of the invention is to provide a split mechanical seal that employs fluid at the seal faces to reduce wear while concomitantly preventing or minimizing leakage at the other faces, without compromising seal performance or integrity.

Other general and more specific objects of this invention will in part be obvious and will in part be evident from the drawings and the description which follow.

SUMMARY OF THE INVENTION

These and other objects are attained by the split mechanical face seal of the present invention in which each of the components of the seal can be split and a barrier fluid can be introduced to the seal faces of the stationary and rotary seal rings. The split mechanical seal of the present invention provides the advantages of a non-contacting seal design, e.g., reduced wear on the seal faces, as well as the advantages of split mechanical seal design, e.g. ease of installation and maintenance, while concomitantly preventing process fluid leakage across the seal surfaces. Additionally, the split mechanical seal of the present invention provides for adjustment of the degree of contact between portions of the seal faces and the flexibility and advantage of being suitable for gas or liquid barrier fluids applications, as well as for multiple environments.

The invention provides a split mechanical face seal that provides fluid sealing between a housing and a rotating shaft and includes first and second seal rings each having at least two seal ring segments and a radially extending seal face. The seal ring faces of the seal rings are opposed to one another. One of the seal rings is connected to and rotates with the rotating shaft, while the other seal ring is connected to the housing. The split mechanical seal includes means for introducing a fluid to the seal faces of the first and second seal rings. The seal also includes means for maintaining co-planar alignment of the seal faces.

Fluid pressure variations at the seal faces can result in distortion of the seal faces. Pressure related distortion of the seal faces can cause coning—deflection of one of the seal faces in a manner that causes the seal faces to depart from a co-planar relationship. Coning can result in loss of the fluid seal between the housing and the rotating shaft. The means for maintain co-planar alignment of the seal faces provided in the seal of the present invention controls coning of the seal faces.

The means for maintaining co-planar alignment of the seal faces can include a resilient member positioned about the second seal ring to permit pivoting of the second seal ring about the split resilient member. By enabling pivoting of the second seal ring about the resilient member, co-planar alignment of the first and second seal faces can be maintained.

The split seal can optionally include a split gland assembly having at least two gland segments that sealingly engage an outer surface of the first seal ring and connect the first seal ring to the housing. The split support member can also include at least one split resilient member, such as a split O-ring, interposed between the split gland assembly and the outer surface of the first seal ring for resiliently supporting the first seal ring in the radial direction.

The split seal can also optionally include a split holder assembly having at least two holder segments for connecting the second seal ring to the rotating shaft. At least one split resilient member, such as a split O-ring, can be interposed between the split holder assembly and the outer surface of the second seal ring. The split resilient member can resiliently support the second seal ring in the radial direction and the axial direction.

The means for introducing a barrier fluid can be a groove formed in the first seal face. The groove can be continuous about the first seal face and can be positioned to form two concentric seal faces on the first seal face thereby providing a dual seal. A continuous, circumferential groove can also be positioned on the first seal face to form lands on both sides of the circumferential groove. The barrier fluid can be a gas or a liquid or a combination thereof. In conjunction with other factors, such as the pressure of the barrier fluid, the groove can be dimensioned such that the barrier fluid within the groove provides a primarily hydrostatic force on the first and second seal faces to cause separation of at least a portion of the first seal face from at least a portion of the second seal face.

The means for introducing a barrier fluid to the first and second seal faces can include a fluid conduit formed through the first seal ring. The fluid conduit can have an opening at the first seal face and can extend substantially axially through the first seal ring to open at the outer surface of the first seal ring. A second fluid conduit can be formed in the split support member. The second fluid conduit can be positioned proximate to and in fluid communication with the fluid conduit formed in the first seal ring.

The split seal can optionally include a system for introducing a closing fluid to a rear surface of the first seal ring. The closing fluid exerts a closing force on the first seal ring that biases the first and second sealing faces towards one another into a sealing relationship. The system for introducing a closing fluid can be a fluid conduit formed in the split support member. The fluid conduit can have an opening proximate the rear surface of the first seal ring to facilitate the introduction of the closing fluid to the rear surface.

The split seal can also include a system for fluidly retaining the seal ring segments of the first seal ring in a sealing relationship in a negative pressure condition. The system for fluidly retaining the seal ring segments of the first seal ring in a sealing relationship can include a fluid conduit formed in the first seal ring for supplying barrier fluid to the outer surface of the first seal ring. The fluid conduit can have an opening in fluid communication with the means for introducing barrier fluid to the first and second seal faces.

BRIEF DESCRIPTION OF THE DRAWINGS

These and other features and advantages of the present invention will be more fully understood by reference to the following detailed description in conjunction with the attached drawings in which like reference numerals refer to like elements through the diferent views. The drawings illustrate principals of the invention and, although not to scale, show relative dimensions.

FIG. 7A is a perspective view of a gland or holder assembly screw according to the teachings of the present invention;

FIG. 7B is a side elevational view of the screw of FIG. 7A;

FIG. 8 is a top fragmentary view of the gland assembly of the split seal of FIG. 1 according to the teachings of the present invention;

FIG. 9 is a side elevational view of a face of a rotary seal ring holder segment of the split mechanical seal of FIG. 1 according to the teachings of the present invention;

FIG. 10 is a side elevational view of a face of a rotary seal ring segment of the split mechanical seal of FIG. 1 according to the teachings of the present invention;

FIG. 11 is a side elevational view of a stationary seal ring segment of the split seal of FIG. 1 according to the teachings of the present invention;

FIG. 12 a side elevational view of a stationary seal ring segment and a rotary seal ring segment of the split mechanical seal of FIG. 1 illustrating the separate force that develop within the seal ring groove according to the teachings of the present invention;

FIG. 13 is a fragmentary side elevational view of the seal ring faces of the split seal shown in FIG. 12 further illustrating the forces within the groove according to the present invention;

FIG. 14 is a sectional view of an elastomeric member according to the present invention;

FIG. 18 is a broken, side elevational view of the gland assembly of the split mechanical seal of FIG. 1 illustrating the fastener apertures formed therein according to the present invention.

DESCRIPTION OF THE ILLUSTRATED EMBODIMENT

Figure 4:
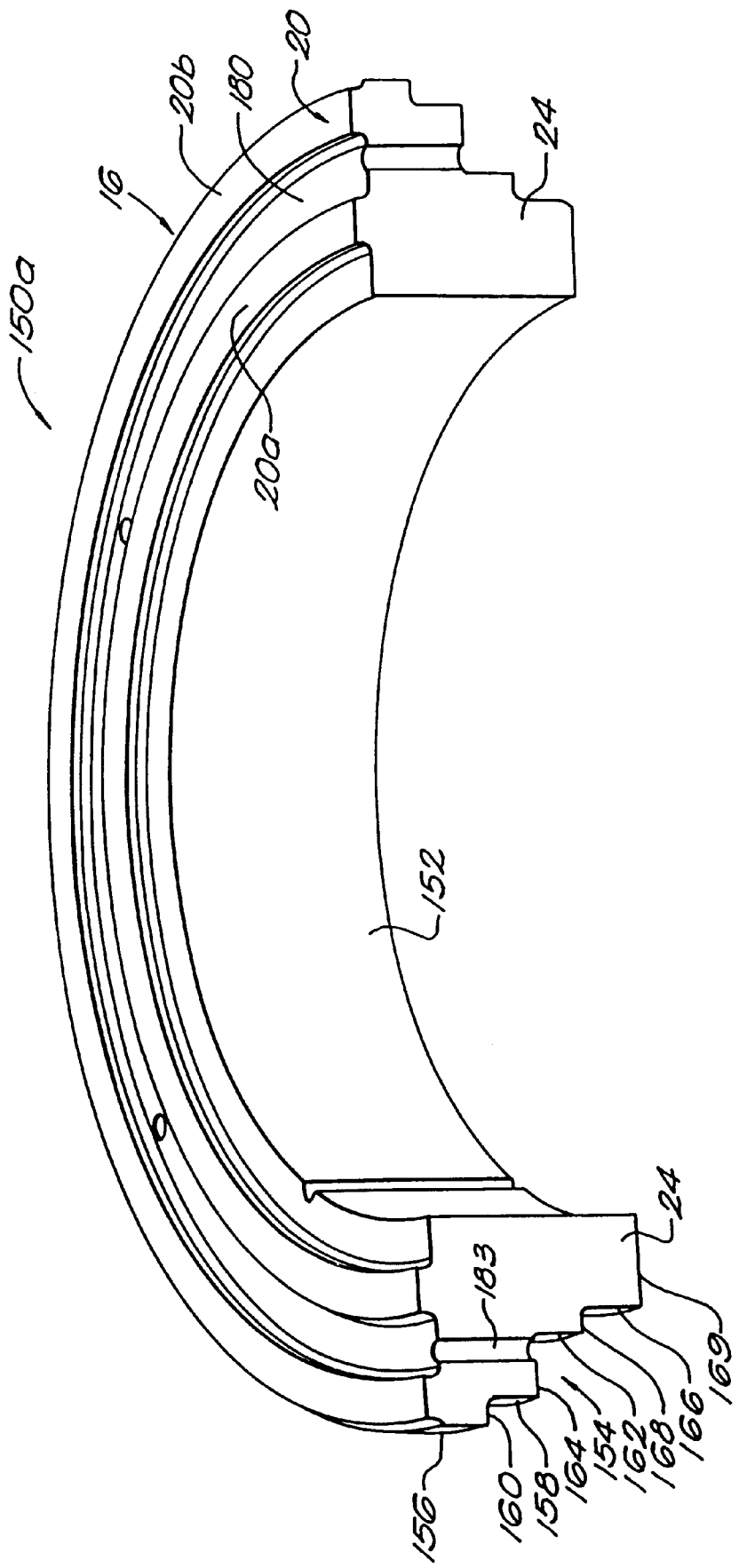
FIG. 4 is a perspective view of one-half of the rotary seal ring of the split mechanical seal of FIG. 1 according to the teachings of the present invention.
Figure 6:
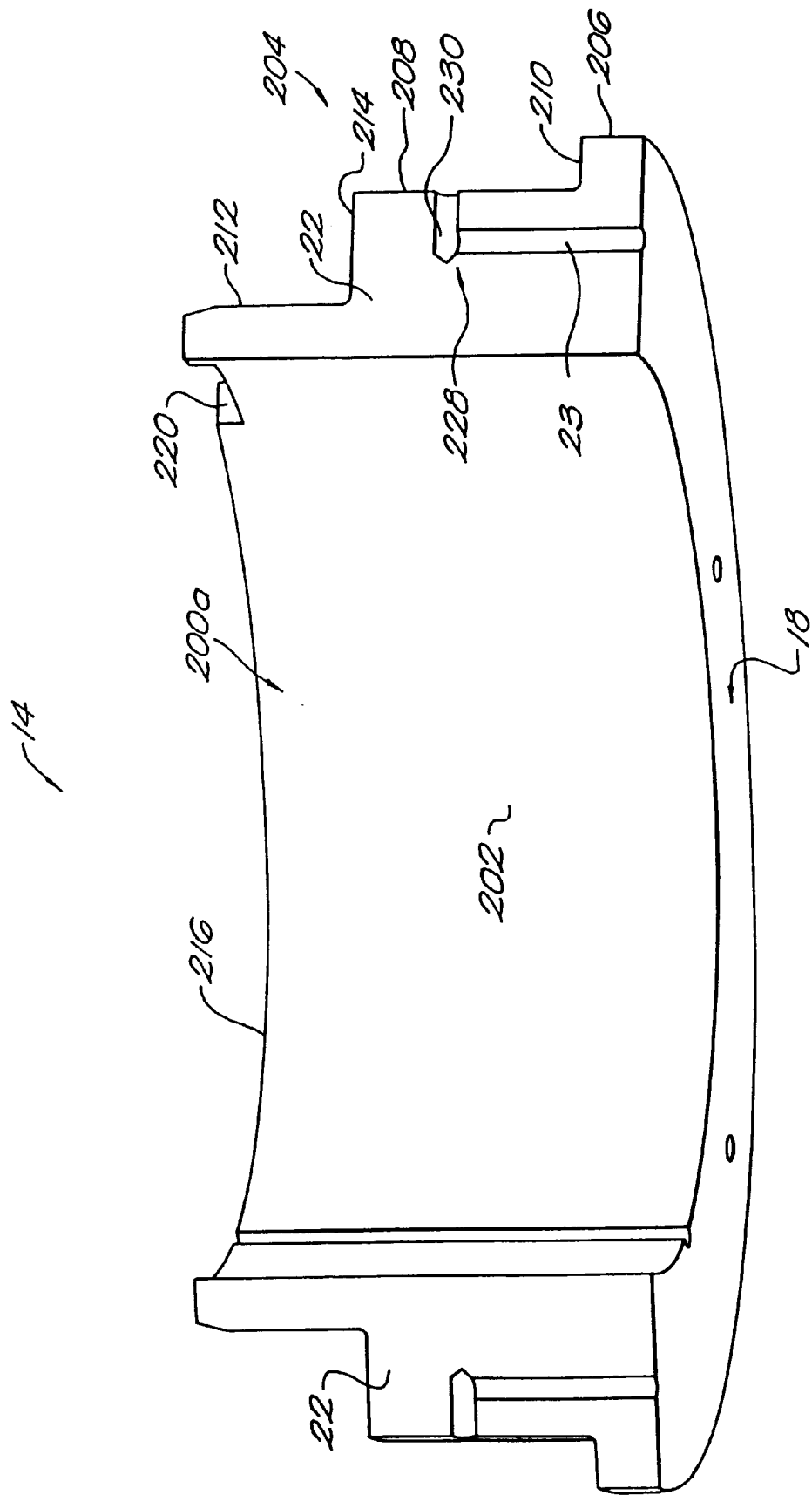
FIG. 6 is perspective view of one-half of the stationary seal ring of the split mechanical seal of FIG. 1 according to the teachings of the present invention.
Figure 16:
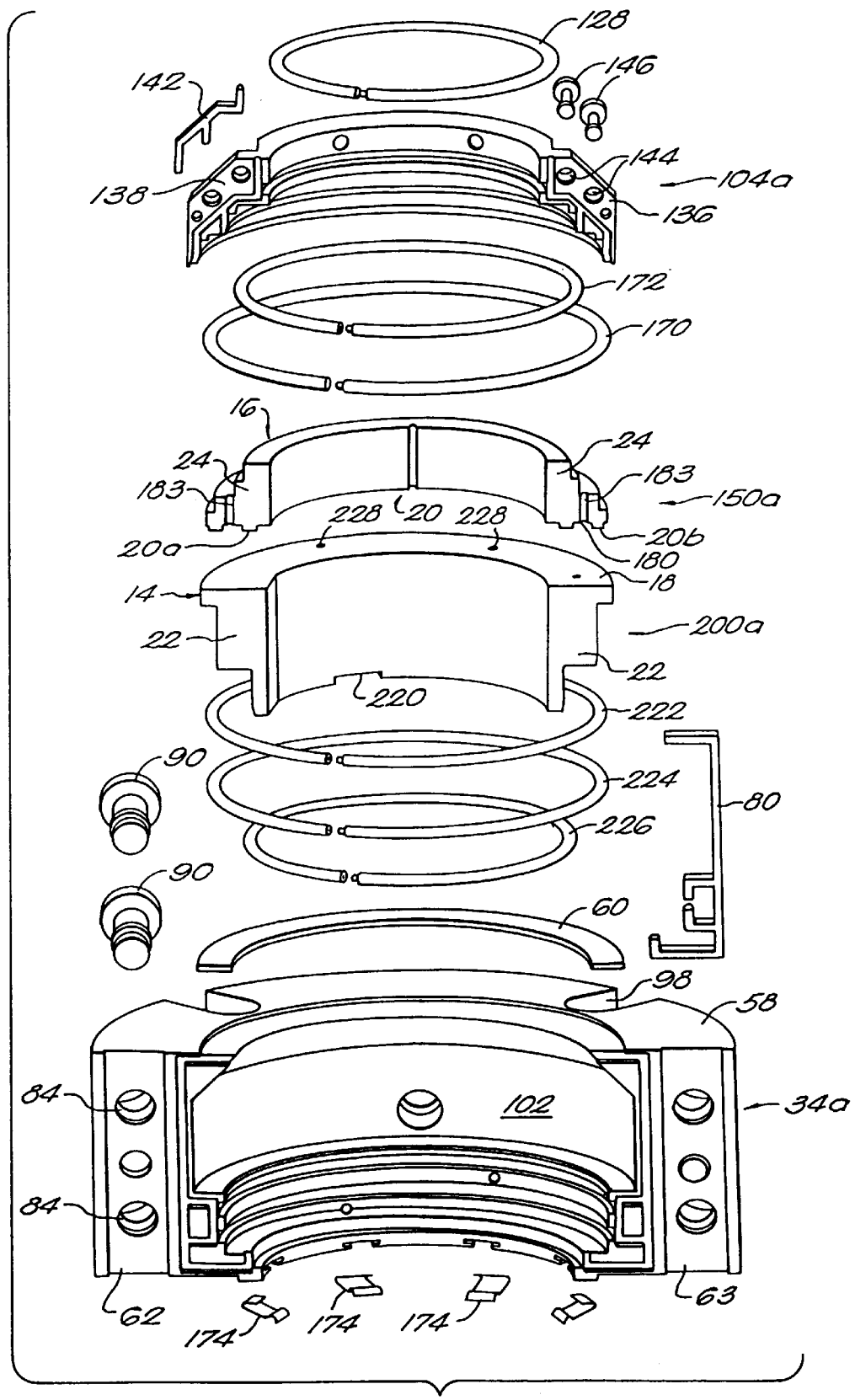
FIG. 16 is an exploded unassembled view of the seal components of FIG. 3 according to the present invention.

U.S. patent application Ser. No.: 08/992,751, filed on Dec. 17, 1997 and entitled SPLIT MECHANICAL FACE SEAL WITH NEGATIVE PRESSURE CONTROL SYSTEM and co-pending U.S. patent application Ser. No. 08/992,611 filed on Dec. 17, 1997 and entitled SPLIT MECHANICAL FACE SEAL WITH SEAL FACE FLUID INTRODUCING STRUCTURE, (Attorney Dovket No. CHT-279), all of which are incorporated herein by reference. The mechanical seal 10 is preferably concentrically disposed about a shaft 12 and is secured to an external wall of a housing 11, such as a pump or the like. The shaft 12 extends along an axis 13, and is mounted, at least partially, in the housing 11. The seal 10 is constructed to provide fluid sealing between housing 11 and shaft 12. thereby preventing a process medium from escaping the housing 11. Fluid sealing is achieved by a stationary seal ring 14 and a rotary seal ring 16, each ring having a radially extending arcuate seal face 20, 18 and a pair of segment sealing surfaces 22 and 24, as shown in FIGS. 4, 6, and 16. The seal face 18 of seal ring 14 is biased into a sealing relationship with the seal face 20 of seal ring 16, as described in greater detail below. In addition, the segment sealing surfaces 22, 24 of each seal ring are biased into sealing engagement with each other. Thus, these individual seal surfaces provide a fluid seal operable under a wide range of operating conditions and in a wide range of services, as described in greater detail below.

The terms "process medium" and "process fluid" used herein generally refer to the medium or fluid being transferred through the housing 11. In pump applications, for example, the process medium is the fluid being pumped through the pump housing.

The terms "axial" and "axially" used herein refer to a direction generally parallel to shaft axis 13. The terms "radial" and "radially" used herein refer to a direction generally perpendicular to shaft axis 13.

The split mechanical seal 10 is preferably a split mechanical non-contacting-type face seal in which a barrier fluid is introduced between the seal faces 18, 20 of the first and second seal rings 14, 16, respectively. In a non-contacting-type face seal the barrier fluid acts to minimize, inhibit, or prevent contact between substantial radial portions of the seal face 18 and radial portions of the seal face 20, thereby reducing the frictional engagement and the resulting wear of the seal faces 18, 20. Accordingly, a non-contacting-type face seal includes seal designs in which there is total separation of the seal faces at all times, total separation of the seal faces under certain conditions, i.e., during periods of shaft rotation, and occasional or partial separation of the seal faces. In contrast, a contacting-type face seal includes seal designs in which partial or complete contact of the seal faces is maintained. In both type of seals, the barrier fluid functions as a heat transfer medium to transfer heat away from the seal faces to reduce the effects of thermal stress on the seal faces.

The barrier fluid used with the present seal can be a gas or a liquid or a combination of both. Typically, the area of the seal faces that remains in frictional contact is greater in barrier liquid applications than in barrier gas applications. Accordingly, the use of a barrier gas can result in less frictional wear on the seal faces 18, 20 relative to the use of barrier liquid. A gas barrier fluid, however, is not suitable for all applications due to the slight amount of leakage of the barrier gas into the process medium that will occur. The use of barrier liquid in the seal can provide increased reduction of the effects of thermal stress due to the typically better heat transfer properties of a liquid compared to a gas. One skilled in the art will appreciate that the choice of one fluid medium over another is dependent on the type of service in which the seal is used. For example, in applications in which a minimal amount of barrier gas leakage is acceptable, a barrier gas may be preferred to reduce wear at the seal faces and to increase the life of the seal. In services in which the presence of a minimal amount of barrier gas within the process medium is undesirable, a liquid seal may be preferable.

Accordingly, the seal of the present invention provides the flexibility and the unique advantage of being suitable for both gas or liquid (or combinations thereof) barrier fluid applications. In addition, many of the features of the mechanical seal of the present invention, as described herein, are suitable for use in traditional mechanical (i.e., contacting) face seal applications as well as non-contacting face seal applications. As such, the seal of the present invention is not solely limited to a non-contact-type seal arrangement (e.g., a gas seal), but enjoys the unique advantages of both conventional split mechanical seals and conventional gas seals in a simple but elegant seal design.

Figure 1:
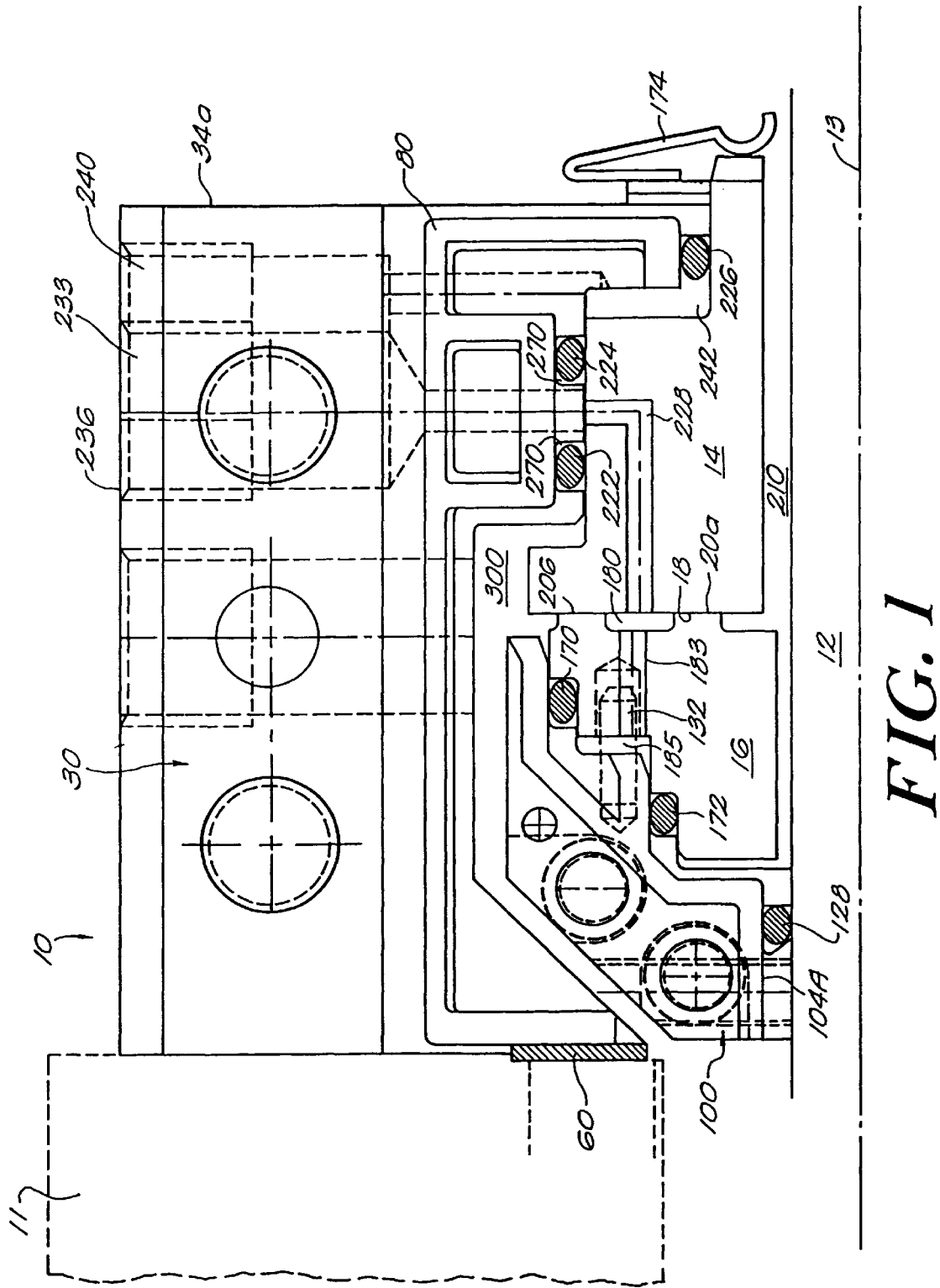
FIG. 1 is a fragmentary view in cross-section of a split mechanical seal, illustrating the structure for introducing a fluid to the seal faces according to the teachings of the present invention.
Figure 2:
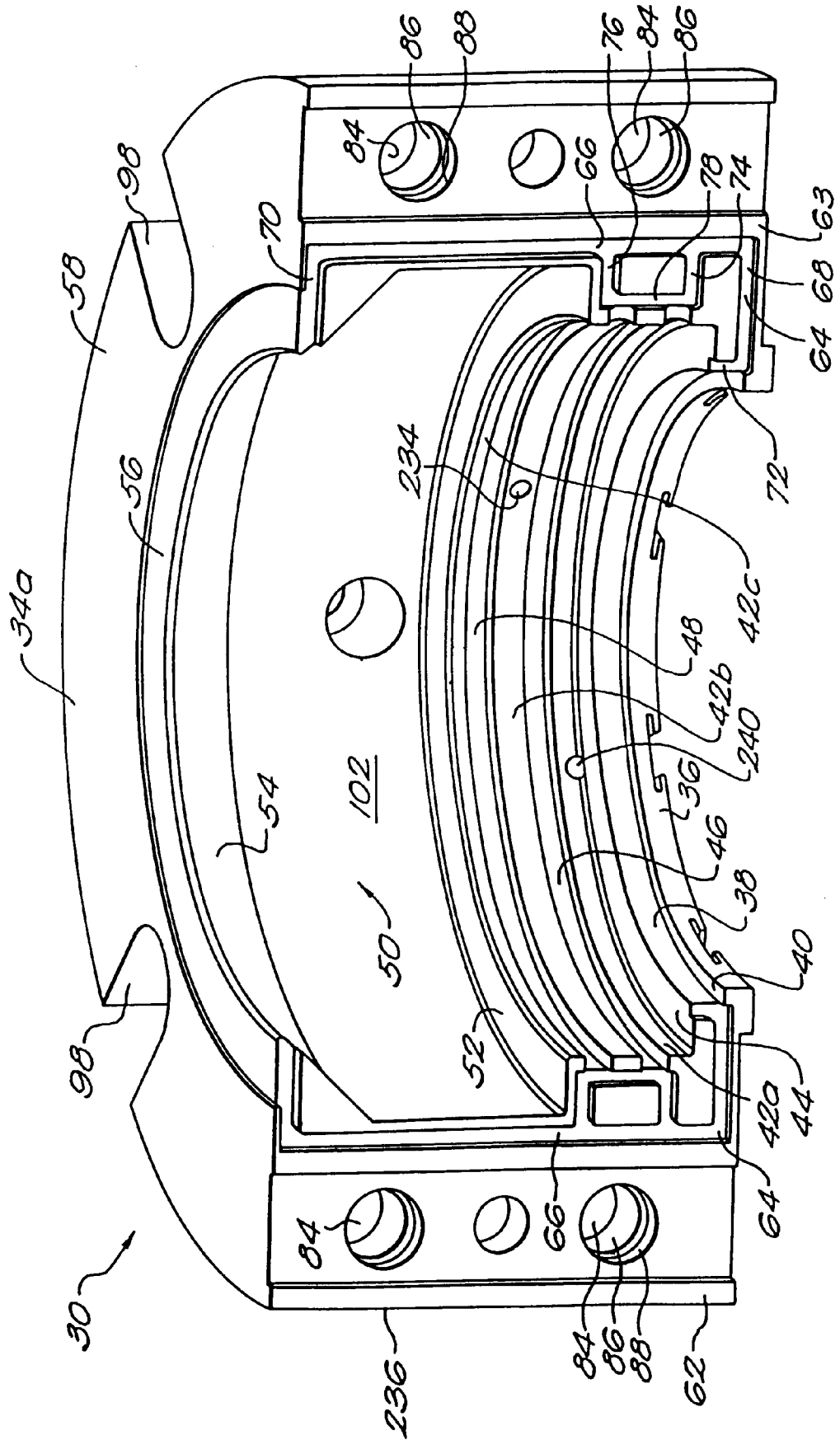
FIG. 2 is a perspective view of one-half of the gland-assembly of the split mechanical seal of in FIG. 1 according to the teachings of the present invention.

With reference to FIGS. 1 through 3 and 16, the illustrated split mechanical seal 10 includes, in addition to the stationary seal ring 14 and the rotary seal ring 16, a seal gland assembly 30 and a rotary seal ring holder assembly 100. The sedal gland assembly 30 includes a pair of identical gland segments or halves 34a and 34b, one of which is shown in FIG. 2. The gland segment 34a has, starting from the axial outermost end (the bottom of FIG. 2), an inner surface that includes an axially extending first surface 36 and an integrally formed and axially extending second surface 38 that is radially stepped from the first surface 36. The first surface 36 and the second surface 38 form in combination therewith a first annular connecting wall 40. An axially extending third surface 42 is radially stepped from the second surface 38 and forms, in combination therewith, a second annular connection wall 44. The third surface 42 is axially segmented into three sections 42a, 42b, and 42c by elastomeric receiving channels 46 and 48, each of which is radially stepped from the third surface 42. An axially extending fourth surface 50 is radially stepped from the third surface 42 by a third annular connection wall 52. A sloped fifth surface 54 extends radially inward and axially outwardly from the gland segment fourth surface 50.

The gland assembly 30 has a housing gasket groove 56 formed along a bottom 58 of the gland assembly 30. The groove 56 seats a flat, annular elastomeric gasket 60 that preferably has an axial dimension greater than the depth of the groove 56, thereby providing a pressure-tight and fluid-tight seal between the mechanical seal 10 and the housing 11. In a preferred embodiment, the housing gasket 60 is pre-cut into two arcuate segments for mounting in each gland segment 34a, 34b. The housing gasket segments are preferably mounted in the groove 56 and secured thereto by an adhesive. This arrangement helps to prevent leakage of the process medium along the mating portions of the mechanical seal 10 and the housing 11 when mounted together.

Each axially extending gland seal surface 62, 63 has formed therein a gland gasket groove 64. The groove 64 has a main axial portion 66 which extends from the gland second surface 38 to the gland gasket groove 56. Groove segments 68 and 70, transverse to the main groove segment 66, extend to the second surface 38 and the gland gasket groove 56, respectively, and groove segment 72, spaced radially inward from main groove segment 66, extends along the second seal surface 38. A pair of internal transverse groove segments 74 and 76 extend transversely from main groove segment 66 to third gland surface 42, and groove segment 78, spaced radially inward from main groove segment 66, extends parallel to the third gland surface 42 to connect transverse groove segments 74 and 76.

Figure 3:
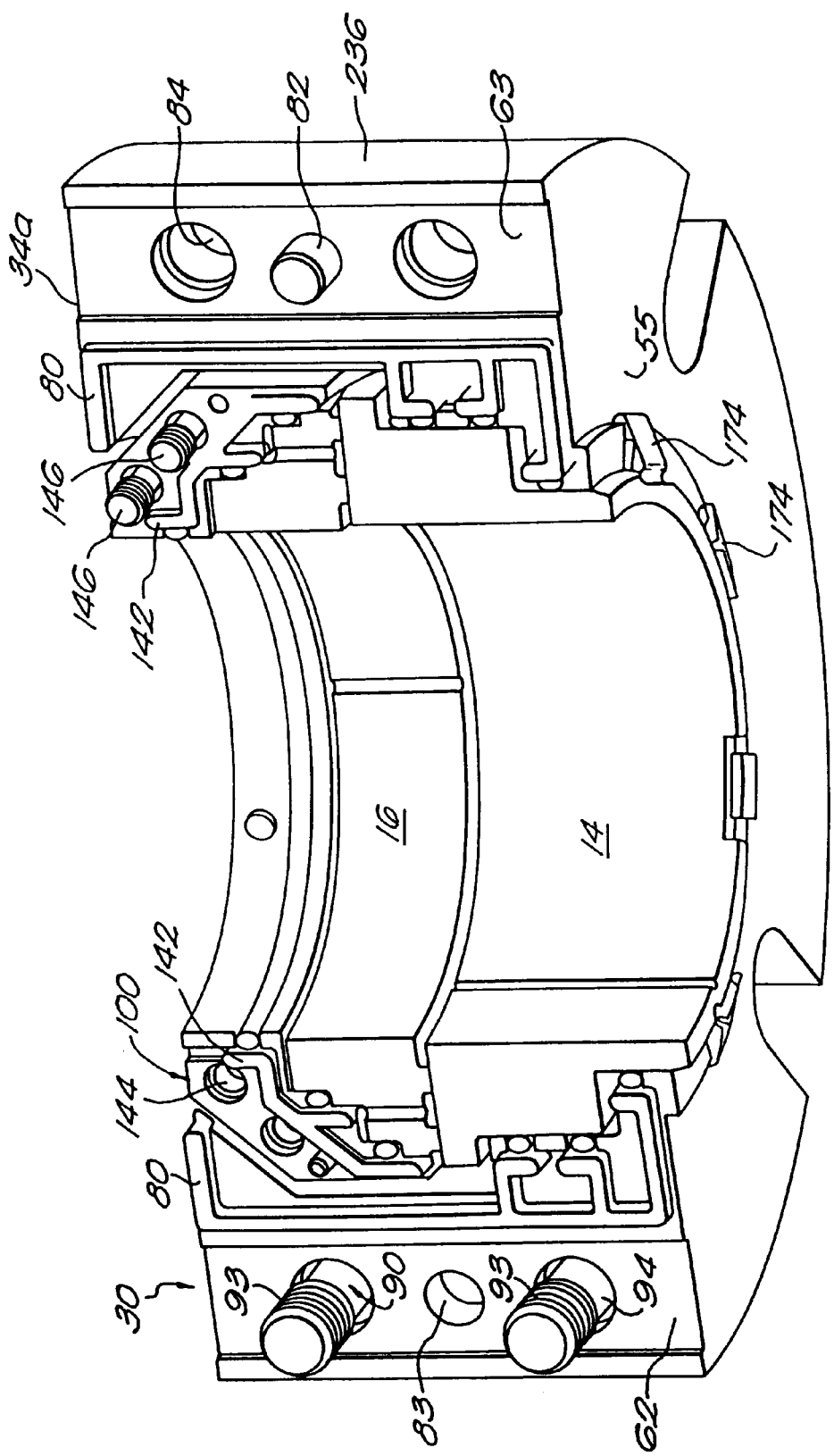
FIG. 3 is a perspective view of one-half of the assembled split mechanical seal of FIG. 1 according to the teachings the present invention.

Referring to FIGS. 1 and 3. an elastomeric gland gasket 80, complementary in shape to gland groove 66, seats in the groove. The gasket 80 extends beyond the split gland seal surfaces 62, 63 when seated in groove 66, as best shown in FIGS. 3 and 8. The exposed portion of the gasket 80 is captured in a complementary groove formed on the split gland seal face of the other gland segment 34b. Capturing both ends of the gasket 80 between the gland seal surfaces 62, 63 prevents the gasket 80 from extruding into the gap formed between the split gland seal surfaces when subject to pressures higher than a selected maximum pressure. This double-capturing features allows the gland segments to withstand greater pressures without developing pressure leaks, as well as relaxing the mechanical tolerances of other components of the seal 10. The gland gasket 80 can be formed from any suitable resilient material, such as elastomeric rubber. Further, although the gasket 80 preferably has the illustrated shape, those of ordinary skill will recognize that the gasket 80 and its corresponding groove 66 can have any suitable geometric configuration.

With reference to FIGS. 2 and 3. each of the gland seal surfaces 62 and 63 has pair of fastener receiving apertures 84 formed therein. The apertures 84 have a tapped smaller-diameter portion 86, and a concentric untapped larger-diameter portion 88. Preferably, the untapped portion 88 of the aperture 84 is disposed closest to the gland seal surfaces 62, 63. An alignment pin 82 extends from gland seal surface 63 and is received in an alignment aperture 83 formed in the seal surface of the other gland segment. The alignment pin 82 serves to ensure a somewhat proper alignment of the gland seal surfaces 62, 63 of the gland seal segments 34a and 34b when assembled.

The apertures 84 mount screws 90 having the configuration illustrated in FIGS. 7A and 7B. The screw 90 preferably has a main shaft 92 and a screw-head portion 96. The screw shaft 92 has a threaded distal portion 93 and an untapped proximal portion 94. The outer diameter of the threaded portion 93 is greater than the outer diameter of the proximal portion 94. As illustrated in FIG. 18, each screw 90 fastens together a pair of gland segments 34a and 34b. When the threaded distal portion 93 of the screw 90 is screwed into the tapped portion 86 of the aperture 84, the distal portion 93 is positively maintained in the aperture 84. As the screw 90 further travels through the aperture 84, the screw distal end enters the untapped portion 88, or clearance gap of the aperture 84. In this orientation, the screw 90, although not snugly secured, is still positively maintained (i.e., is not detachable) in the aperture 84. In a preferred embodiment, the diameter of the distalthreaded portion 93 mates with the diameter of the tapped smaller-diameter portion 86.

The illustrated configuration of the screw 90 and the aperture 84 of the present invention provide significant advantages. In particular, the screw 90 can be mounted in the fastener-receiving aperture 84 from either side of the gland segments 34a, 34b prior to assembly, which is particularly useful in limited access installations, and is positively maintained in the gland segment. Preventing the screw 90 from completely detaching from the gland segment prevents accidental loss of the screw 90 during assembly and disassembly, thus facilitating assembly of the seal while reducing installation time.

Each of the gland segments include two fastener recesses 98 to accommodate bolts (not shown) to mount mechanical seal 10 of the invention to the housing 11. Alternatively, bolt-tabs may be provided about the periphery of the seal 10 to facilitate connection of the seal 10 to the housing 11. Examples of suitable bolt tabs are shown in U.S. Pat. No. 5,209,496 and U.S. Pat. No. 5,571.268, both of which are assigned to the assignee hereof and are incorporated herein by reference.

Figure 5:
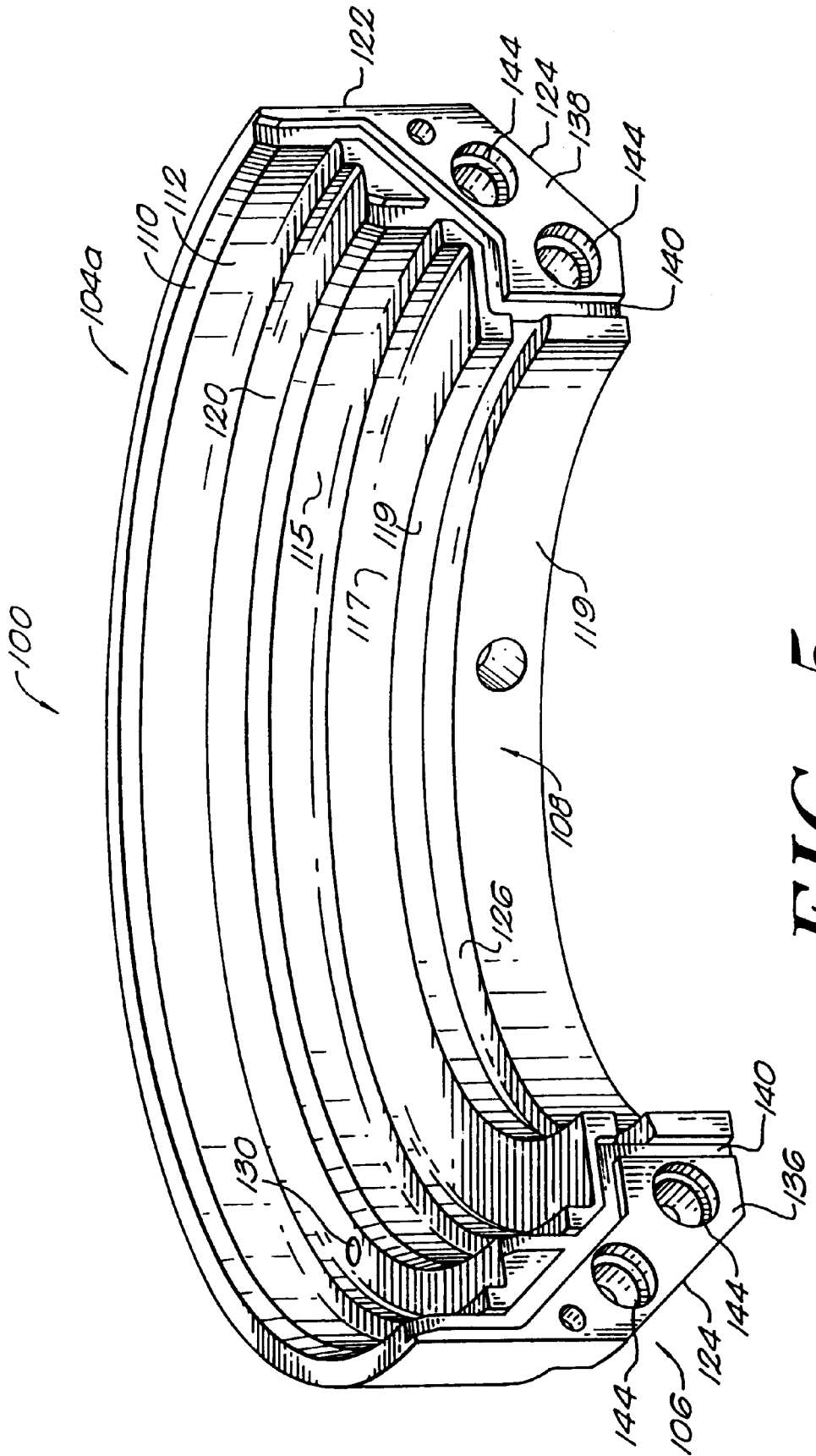
FIG. 5 is a perspective view of one-half of the rotary seal ring holder assembly of the split mechanical seal of FIG. 1 according to the teachings of the present invention.

As illustrated in FIGS. 1, 3, 5, and 9. a holder assembly 100 is disposed in a chamber 102, shown in FIG. 2, formed in gland assembly 30 and is spaced radially inward therefrom. It should be understood, however, that the holder assembly 100 need not be disposed within the gland assembly 30. The holder assembly 100 has a pair of identical arcuate holder segments 104a and 104b, one of which is shown in FIG. 5. As shown in FIGS. 5 and 9, each holder segment includes an outer surface 106 and an inner surface 108. The holder segment inner surface 108 has a radially inward sloping first surface 110 that terminates in an axially extending second surface 112. A pair of successive radially inwardly stepped surfaces form a third surface 114 and a fourth surface 115, respectively. The second surface 112 and the third surface 114 have a radially inward extending first wall 118 integrally formed therebetween, and the third surface 114 and the fourth surface 115 have a radially inward extending second wall 120 integrally formed therebetween. A further pair of successive radially inwardly stepped surfaces form a fifth surface 116 and a sixth surface 119, respectively. The fourth surface 115 and the fifth surface 116 have a radially inward extending third wall 121 integrally formed therebetween, and the fifth surface 116 and the sixth surface 119 have a radially inward extending fourth wall 117 integrally formed therebetween. The diameter of the sixth surface 119 is preferably equal to or slightly greater than the diameter of the shaft 12, to which the holder assembly 100 is to be attached.

The holder segment outer surface 106 has a first axially extending outer surface 122 and a radially inward sloping second outer surface 124. In a preferred embodiment, the outer diameter of the holder segment first outer surface 124 is less than the diameter of the gland segment fourth surface 50. This clearance allows the holder assembly 100 to seat within the gland assembly 30 for unobstructed rotational movement therein. The outer diameter of the second outer surface 124 is preferably less than the inner diameter of the gland segment fifth surface 54. and preferably greater than the gland segment third surface 42.

The sixth face 119 of the holder segment 104a has formed thereon an annular channel 126 for mounting a split shaft gasket 128. When mounted in the channel 126, the gasket 128 sealingly mates with the shaft 12, providing a fluid-tight seal along the holder and shaft interface (see FIG. 1). The second wall 120 preferably has formed therein a cylindrical alignment bore 130 for receiving one end of an alignment pin 132 (FIG. 1). The other end of the alignment pin 132 is received in a corresponding bore 134 in the rotary seal ring 16. The protrusion 132 operates as a mechanical rotary means by biasing the rotary seal ring 16 into rotational movement, as described in greater detail below.

The illustrated holder segments 104a, 104b have a holder gasket groove 140, having the configuration illustrated in FIG. 5, formed on each split holder seal face 136, 138. A holder gasket 142, complementary in shape to the groove 140, seats in groove 140. The holder gasket 142, when seated in the groove 140, extends beyond the holder seal faces 136, 138, as best shown in FIG. 3. The exposed portion of the gasket 142 seats in a complementary groove formed in the opposite holder segment seal face. This arrangement provides for a fluid-tight seal at pressures higher than a selected value, as described above. The gasket can be composed of any suitable deformable material, such as elastomeric rubber.

Each of the holder segments 104a, 104b have a pair of fastener-receiving apertures 144 that mount screws 146 (FIG. 16). The holder apertures 144 are similar to the fastener-receiving apertures 84 of the gland segments 34a, 34b and likewise screws 146 are similar to screws 90. Advantageously, the screws 146 and apertures 144 operate in the aforementioned manner.

The holder assembly 100, the gland assembly 30, and the screws 90 and 146 can be formed from any suitably rigid material, such as, for example, stainless steel.

With reference to FIGS. 4 and 10, the rotary seal ring assembly 16 includes a pair of arcuate rotary seal ring segments 150a and 150b, one of which is shown in FIG. 4. The rotary seal ring segments have a substantially smooth arcuate inner surface 152. The inner diameter of the inner surface 152 of the rotary seal segments is greater than the diameter of the shaft 12 to permit mounting thereon.

The rotary seal segments outer surface 154 has a series of axially extending outer surfaces each of which is stepped radially inward from the other. An axially extending second outer surface 158 is stepped radially inwardly from a first axial extending outer surface 156. The first outer surface 156 and the second outer surface 158 form in combination therewith a first annular connecting wall 160 that extends radially between the first and second outer surfaces. A third axial extending outer surface 162 is stepped radially inward from the second outer surface 158 by a second annular connecting wall 164 that extends radially between the second and third outer surfaces. A fourth axially extending outer surface 166 is stepped radially inward from the third outer surface 162. The third outer surface 162 and the fourth outer surface 166 form in combination a third annular connecting wall 168 that extends radially between the third and fourth outer surfaces. A fourth annular connecting wall 169 extends radially from the fourth outer surface 166 to the inner surface 152.

The stepped outer surface 154 of the rotary seal segments are complementary to the stepped inner surface 108 of the holder segments 104a, 104b to permit mounting of the rotary seal segments into the holder segments. The diameter of the rotary seal segment fourth outer surface 166 is less than the diameter of the holder segment fifth surface 116. Likewise, the diameters of the rotary seal segment second outer surface 158 and the third outer surface 162 are less than the diameters of the holder segment third surface 114 and fourth surface 115, respectively.

Elastomeric members, such as split O-rings 170 and 172, can be oncentrically disposed about the rotary seal ring 16. In a preferred embodiment, the O-ring 170 seats along holder segment second surface 112 and rotary seal segment second outer surface 158 and can selectively abut either first connecting wall 160 or holder segment first wall 118, as shown in FIGS. 1, 9, 10 and 15A. The O-ring 172 seats along the holder segment fourth surface 115 and third wall 121 and abuts rotary seal segment fourth outer surface 166 and third connecting wall 168. The O-rings 170 and 172 are sufficiently resilient to place each of the rotary segment sealing surfaces 24 into sealing contact with the corresponding seal ring segment, thereby forming a fluid-tight and pressure-tight seal. The O-rings 170 and 172 function to apply, in combination with the process fluid, a radially inward force that resiliently biases the axial seal surfaces 24 of the rotor segments together thereby preventing or minimizing leakage through the seal faces. In addition, the O-ring 172 applies axial support to the rotary seal ring 16 to inhibit axial motion of the rotary seal ring 16.

Fluid pressure variations between the seal faces 18 and 20, as well as at the outer and inner diameter surfaces of the seal faces, can result in distortion of the seal faces 18 and 20a, b. This type of distortion can cause coning of the seal faces. The term "coning" refers to the deflection of one of the seal faces in a manner that causes the two seal faces to depart from a co-planar relationship. Coning typically results in unwanted seal face contact at either the outer or the inner diameter of the seal rings.

Figure 17A:
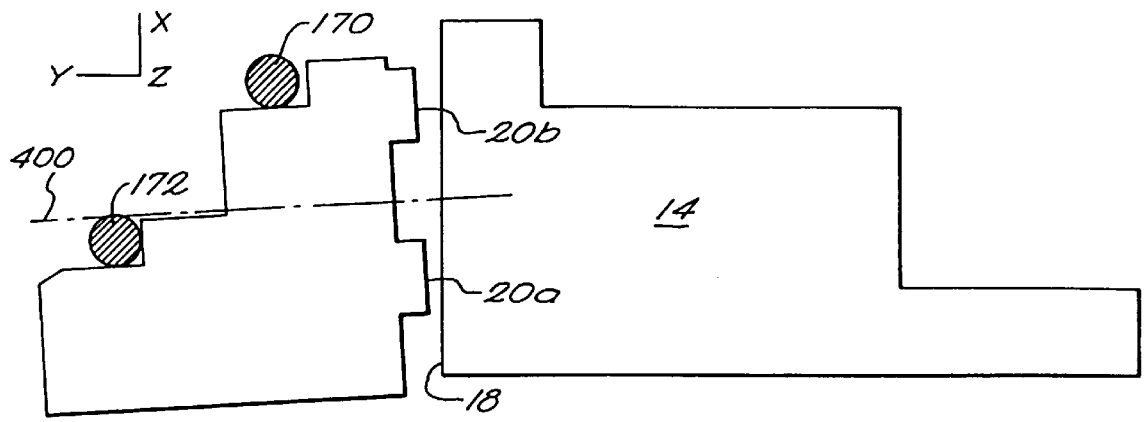
FIGS. 17A–C are side elevational views in cross-section of the stationary seal ring segment and the rotary seal ring segment of the split mechanical seal of FIG. 1 illustrating pivoting of the rotary seal ring.
Figure 17B:
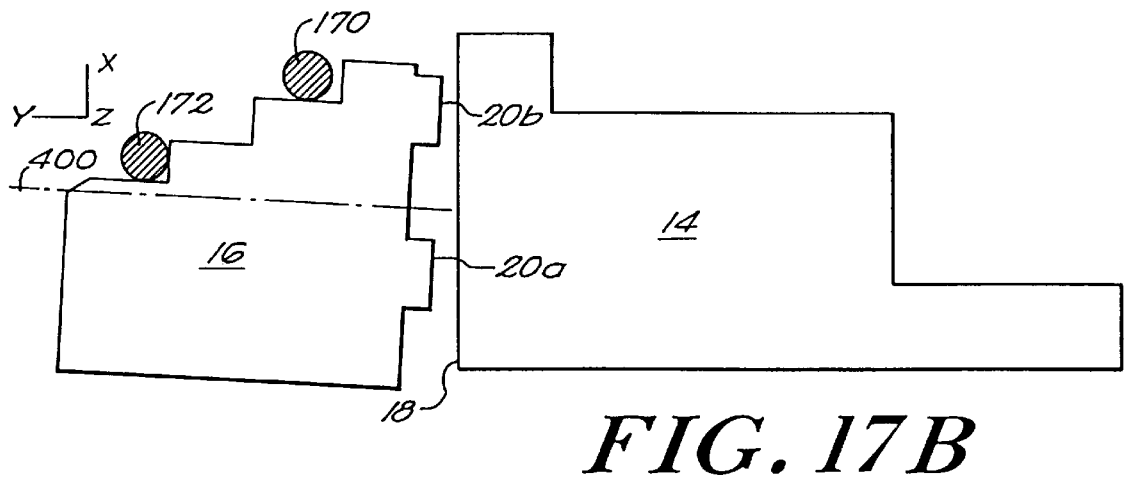
Figure 17C:
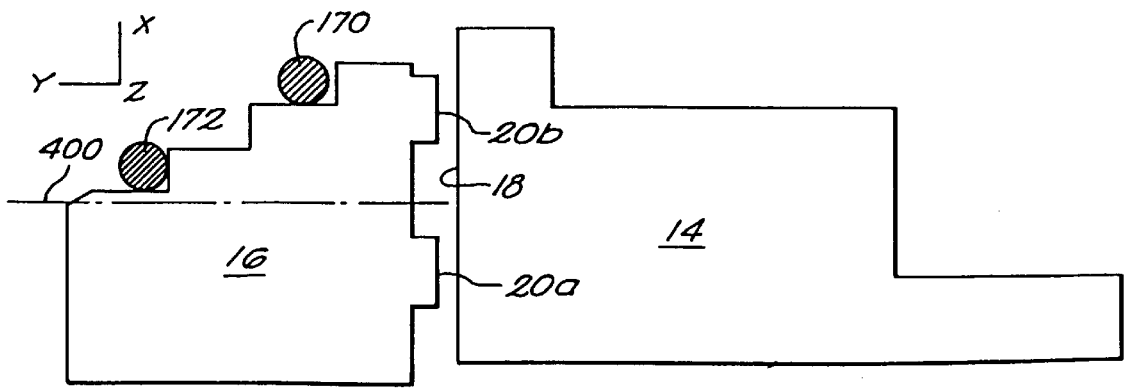

To prevent coning, the O-ring 172 is positioned along the outer surface 154 of the rotary seal ring segments 150a and 150b at a location approximately along axis 400 passing through the rotary seal ring 16, as illustrated in FIG. 17C. In this position, the O-ring 172 acts as a resilient pivoting member about which the rotary seal ring can pivot. The pivoting action of the O-ring 172 operates to maintain the seal faces 18 and 20 in co-planar alignment.

FIG. 17A and 17B illustrates in exaggerated form the effects of coning on the rotary seal ring seal face 20 when the O ring 172 is positioned at a position other than along the axis 400. The specific location of axis 400, and thus O-ring 172, is dependent upon a number of factors, such as the magnitude of the fluid pressure forces on the rotary seal ring and the specific dimensions of the seal ring. The location of axis 400 for a particular seal ring configuration can be readily determined by one skilled in the art using conventional finite element analysis techniques. In FIG. 17A, pressure distortions at the seal faces 18 and 20a, b cause the inner diameter portion of the rotary seal face portion 20a to deflect toward the stationary seal ring seal face 18 and the outer diameter portion of seal face portion 20b to deflect away from seal face 18. In FIG. 17A, the O-ring 172 is positioned radially inward from the axis 400. Conversely, in FIG. 17B, the O-ring 172 is positioned radially outward from the axis 400. Thus, pressure distortions at the seal faces 18 and 20a, b cause the outer diameter portion of seal face portion 20b to deflect toward seal face 18 and the inner diameter portion of the seal face portion 20a to deflect away from the seal face 18.

The pivoting action of the O-ring 172 provides for a resilient pivoting of the seal face 20 during full operation of the split mechanical seal 10 in both non-contacting and contacting face seal modes, while concomitantly ensuring either consistent co-planar contact between the opposed seal faces or maintenance of a predetermined gap size between these faces.

Those skilled in the art will recognize that the O-rings 170 and 172 are not limited to the specific positions described herein. Alternate positions are possible, including, but not limited to, seating the pivoting resilient member (O-ring 172) at a rear surface of the stator seal ring 14 to provide a similar seal face alignment function.

The illustrated seal face 20 of the rotary seal ring segments has a continuous, arcuate circumferential groove 180 formed therein, as is best shown in FIG. 4. In a preferred embodiment, the groove 180 is radially disposed between the inner surface 152 and the first outer surface 156 of the rotary seal ring 16. The groove 180 accordingly splits the rotary seal ring seal face 20 into two concentric seal faces or land portions 20a and 20b. In this manner a dual seal is formed between the stationary seal ring 14 and the rotary seal ring 16.

With reference to FIGS. 1, 12 and 13, the groove 180 communicates with the seal face 18 of the stator seal ring 14. A barrier fluid at a specified regulated pressure, generaly greater than the process pressure, is introduced to the groove 180 through barrier fluid conduits 228 formed in the stator seal ring 14, as is described in further detail below. The barrier fluid acts to provide a separation force to the seal faces 18 and 20, as indicated by the arrows labeled $F_A$ in FIGS. 12 and 13. The separation force is a primarily hydrostatic force that operates to minimize, inhibit, or prevent contact between radial portions of the seal face 18 and radial portions of the seal faces 20a and 20b, thereby reducing the frictional engagement and the resulting wearing of the seal faces 18, 20a, 20b. The magnitude of the separation force is dependent on a number of factors, such as, for example, the dimensions of the groove, e.g., axial depth and radial width, the configuration of the seal faces, the size of the conduit 228, as well as the pressure of the barrier fluid. The choice of barrier fluid is also a factor when selecting the magnitude of the separation force and the degree of seal face separation. In applications in which the barrier fluid is a gas, less seal face contact is desirable and, thus, a greater degree of seal face separation is preferred. In barrier liquid applications, a smaller degree of seal face separation is required due to the increased heat transfer properties of a liquid compared to a gas.

A significant advantage of the split mechanical seal 10 of the present invention is that it allows for the introduction of a cooling or barrier fluid to the seal faces 18, 20 of the seal rings 14, 16. A further advantage of the seal of the present invention is that the seal can operate with either a gas or liquid by adjusting the degree of seal face contact, as well as the size of the gap formed between the seal faces 18 and 20. When a liquid is used, the seal can revert to a conventional balance arrangement to operate as a conventional contacting mechanical face seal. Conversely, when a gas is used, the seal operates as a non-contacting mechanical face seal in which the seal faces are partially or completely separated. When operating in the non-contact mode, the degree of seal face contact, i.e., the magnitude of the gap between the seal faces, can be controlled and balanced by a closing fluid system, as described below. operating in combination with the O-ring 172, as well as, by adjusting the barrier fluid pressure at the groove 180. Thus, the groove 180 and the axial bores 228, in combination with these other features, allow convenient operation of the split mechanical seal in both non-contacting and contacting modes of operation, without regard to promoting leakage through the seal surfaces of the seal ring segments.

The barrier fluid within the groove 180 exerts a radially outward force $F_{Ro}$ and a radially inward force $F_{Ri}$ on the rotary seal ring 16, as illustrated in FIGS. 12 and 13. Because the surface area at the outer wall 184 is greater than the surface area at the inner wall 186 of the groove 180, these forces result in a net radially outward force $F_{RO}$ on the rotary seal ring 16. The groove 180 is dimensioned such that the radially outward force $F_{RO}$ created by the barrier fluid within the groove does not generally exceed, and is indeed several orders of magnitude less than, the radially inward force $F_{RI}$ on the rotary seal ring 16 from the O-rings 170, 172 and from the process medium, as described in detail below. Thus, the radially outward force $F_{RO}$ due to the barrier fluid does not separate or "blow apart" the rotary seal ring segments 150a, 150b of the rotary seal ring 16.

An exemplary seal was constructed having a groove 180 dimensioned to have an axial depth of 0.068 inches and a radial width of approximately 0.25 inches. In this example, the groove was positioned approximately 0.375 inches from the inner surface 152 of the rotary seal ring 16. This resulted in the radial width of the two rotary seal ring surfaces 20a and 20b being approximately 0.185 inches.

The seal of the present invention is not limited to the described and illustrated groove configurations, but can include other groove designs, such as, for example, a series of spiral grooves radially disposed between the inner surface 152 and the outer surface 156 of the rotary seal ring 16. The spiral grooves accordingly split the rotary seal ring face 20 into the concentric seal faces 20a and 20b to form a dual seal. The spiral grooves can be uni-directional or bi-directional grooves. Barrier fluid within the grooves provides a primarily hydrodynamic separation force between the seal faces 18 and 20a, 20b. Examples of suitable spiral groove designs are described in U.S. Pat. Nos. 4,889, 348, 5,143,384 and 5,529,315, all of which are incorporated herein by reference.

With reference to FIGS. 1, 4, 10, 12 and 15, a plurality of axial bores 183 extend through the rotary seal ring segments from the groove 180 to the second annular connecting wall 164. The bores are preferably evenly spaced apart along the circumference of the seal ring 16. Those of ordinary skill will recognize that any number and manner of spacing can be utilized.

Figure 15:
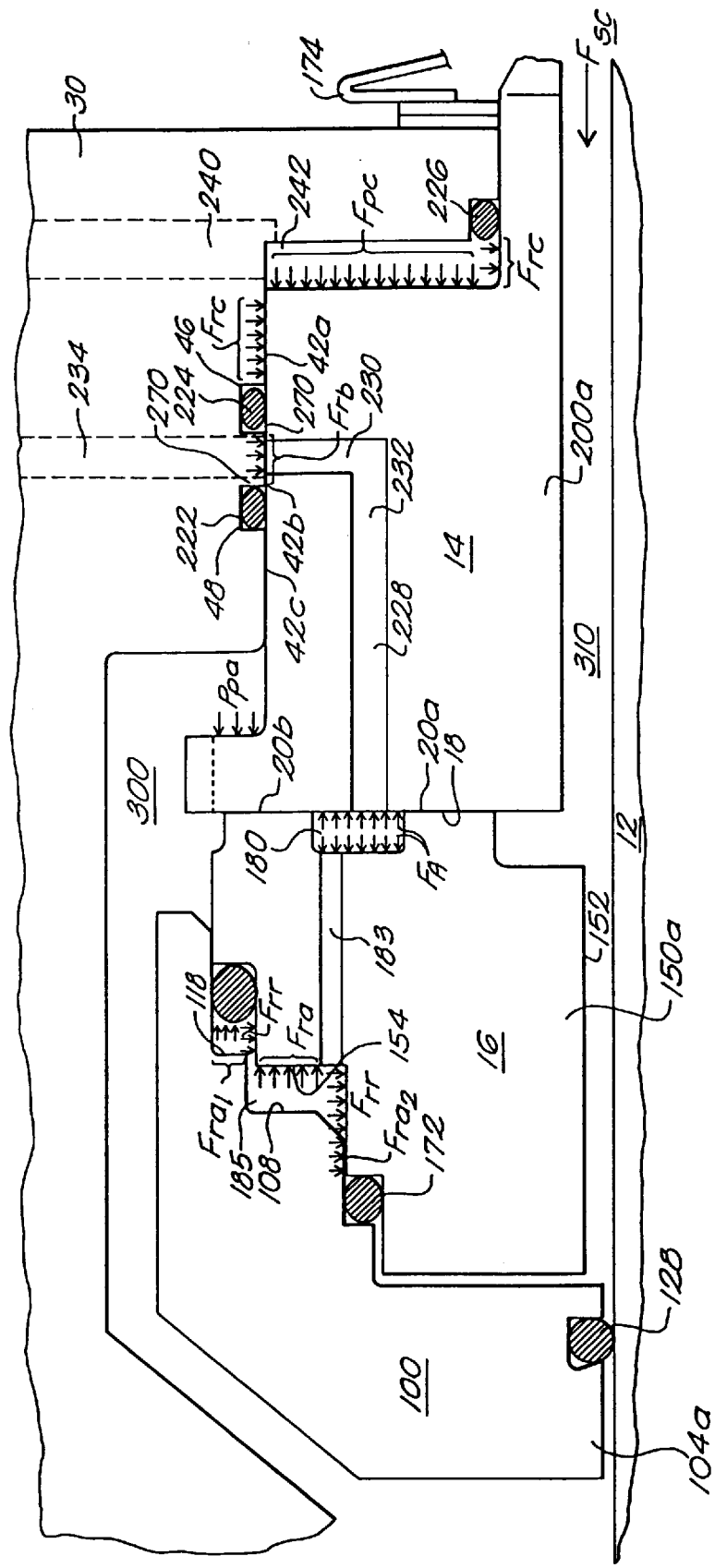
FIG. 15 is a fragmentary view in cross-section of the split mechanical seal shown in FIG. 1 according to the present invention.
Figure 15A:
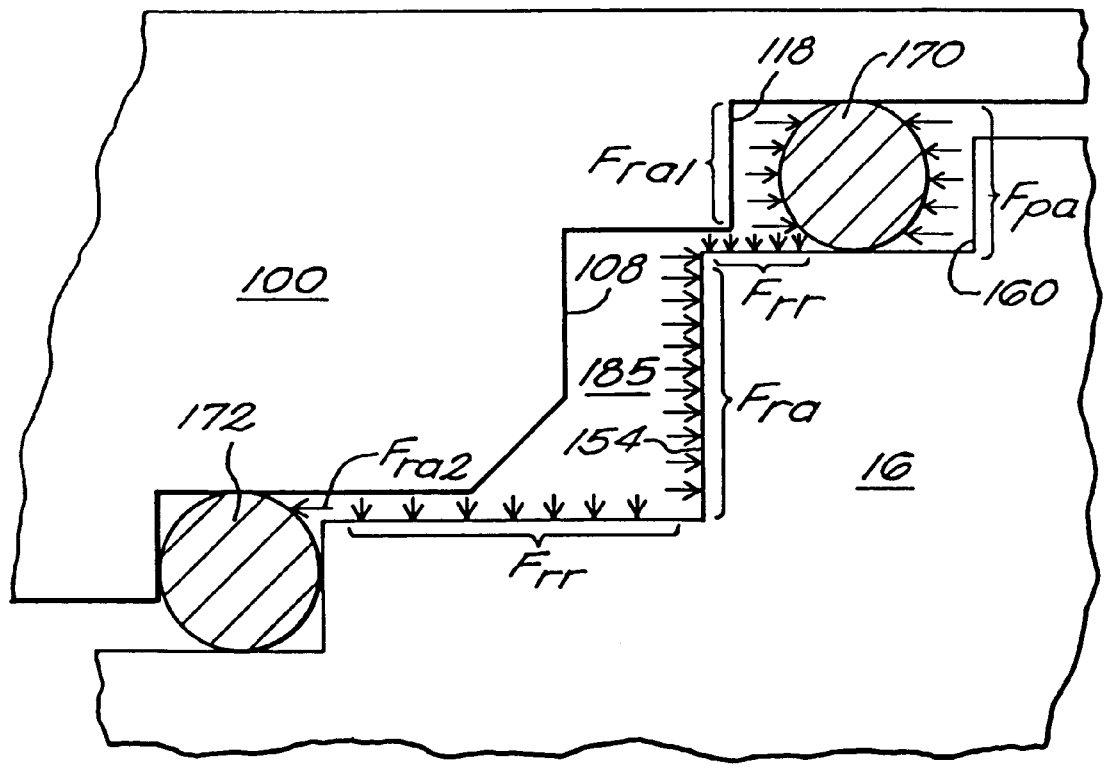
FIG. 15A is a fragmentary view in cross-section of the holder assembly and the rotary seal ring of the split mechanical seal shown in FIG. 1 according to the present invention.

Barrier fluid can be introduced to outer surface 154 of the rotary seal ring segments through the axial bores 183. As best illustrated in FIG. 15, the O-rings 170 and 172, the outer surface 154 of the rotary seal ring segments, and the inner surface 108 of the holder segments form, in combination therewith, a fluid-tight, pressure-tight annular chamber 185. Barrier fluid introduced to the chamber 185 through the bore 228, the groove 180, and the axial bore 183 exerts a radially inward fluid force $F_{rr}$ on the outer surface 154 of the rotary seal ring segments (FIG. 15A). The radially inward fluid force $F_{rr}$ acts in combination with the radial inward force provided by O-rings 170 and 172 and the process medium to place each of the rotary segment sealing surfaces 24 into sealing contact with another segment, thereby maintaining a fluid-tight and pressure-tight seal.

The radially inward fluid force $F_{rr}$ can be varied or adjusted by controlling and/or regulating the pressure of the barrier fluid in the chamber 185. In this manner, the radially inward force on the rotary seal ring segments can be adjusted to compensate for changes in operating conditions within the seal. For example, a negative pressure condition, in which the pressure of the fluid at the outer surface 154 of the rotary seal ring segments drops below the pressure of the fluid at the inner surface 152 of the rotary seal ring segments, can result in separation of the rotary seal ring segments, as is described in more detail below. A negative pressure condition can also occur if the fluid pressure at the outer surface 154 drops below the pressure of the barrier fluid introduced between the seal faces 18 and 20a, b. The phrase "negative pressure condition" is defined herein to mean any condition in which the pressure of the fluid at the outer surfaces of the seal rings and holder assembly is less than the pressure of the fluid at the inner surfaces of the seal rings and holder assembly or the pressure of the fluid introduced to the seal faces. In such a condition, the radially inward force $F_{rr}$ can be increased to inhibit separation of the seal ring segments and thereby maintain the seal between the seal ring segment surfaces 24.

In addition to the radially inward fluid force, the barrier fluid within chamber 185 exerts an axial fluid force $F_{ra}$ on the rotary seal segments (FIG. 15A). Components of the axial fluid force $F_{ra}$ aid in maintaining O-rings 170 and 172 in their seated positions, as well as urge the seal faces of the rings toward each other. Axial fluid force component $F_{ra1}$ biases O-ring 170 into sealing engagement with the outer surface 154 of the rotary seal ring segments and inner surface 108 of the holder segments. The axial fluid force component $F_{ra1}$ is opposed by an axial component of the process fluid face $F_{pa}$ on the opposite side of O-ring 170. The O-ring 170 is free to move between surface 160 of the rotary seal ring 16 and surface 118 of the holder assembly 100, depending on which fluid pressure force is greater. This freedom of movement is provided to facilitate pivoting of the rotary seal ring about O-ring 172. The axial fluid force component $F_{ra2}$ biases O-ring 172 into sealing engagement with the outer surface 154 of the rotary seal ring segments and inner surface 108 of the holder segments.

A significant advantage of the negative pressure control feature of the illustrated seal is that it allows for a single mechanical seal to operate in multiple environments. Thus, it is not necessary for the end user to stock multiple different seal types for employment in various, specific operating conditions. This reduces overall cost to the end user because they need only purchase and stock a single seal type, the split mechanical seal of the present invention, which can be adjusted to provide a fluid seal under multiple operating conditions.

Those of ordinary skill will readily recognize that the illustrated split mechanical seal 10 of the present invention need not include the rotary seal ring axial bore 183 in order for the seal to operate in its intended manner. For example, in applications in which the possibility of a negative pressure condition is unlikely, the rotary seal ring 16 can be configured without the axial bore 183 without effecting the operation and efficiency of the split mechanical seal 10.

As shown in FIGS. 6 and 11 the stationary seal ring 14 includes a pair of arcuate seal ring segments 200a, 200b each identical to the other. The stationary seal ring arcuate segments 200a, 200b have a substantially smooth arcuate inner surface 202 extending parallel to the first axis 13 and an outer surface 204. The stationary seal ring segment includes seal face 18 and a first outer surface 206 that extends axially therefrom, as well as a further axially extending second outer surface 208 that is stepped radially inward from the first outer surface 206. The first outer surface 206 and the second outer surface 208 form in combination therewith a first annular connecting wall 210 that extends radially between the first and second outer surfaces. An axial extending third outer surface 212 is stepped radially inwardly from the second outer surface 208 by a second annular connecting wall 214 that extends radially between the second and third outer surfaces. The stationary seal ring 14 has a substantially smooth arcuate bottom surface 216 opposed to seal face 18. The stationary seal rings segments 200a, 200b have a recess 220 formed along the bottom surface 216. The mechanical spring clip 174. mechanically coupled to a bottom surface 55 of the gland assembly 30, seats in the recess 220 (FIG. 3 and 16). This arrangement helps align and seat the stationary seal ring 14 in the chamber 102, as well as provide a mechanical impedance for preventing the stationary seal ring segment 14 from rotating with shaft 12 and the rotary seal ring 16. A suitable mechanical clip is Chesterton Mechanical Seal Product No. 442, for sale by the A. W. Chesterton Co.

The inside diameter of the stationary segment inner surface 202 is greater than the shaft 12 diameter, and is greater than the diameter of the inner surface 152 of the rotary seal ring 16, thereby allowing motion of both the shaft 12 and the rotary seal 16 relative to the stationary seal ring 14. A plurality of elastomeric members, i.e. split O-rings 222, 224, and 226, provides a radially inward biasing force sufficient to place the segment sealing surfaces 22 of the stationary seal ring segment 14 in sealing contact with the other stationary seal ring segment. Additionally, the O-rings 222, 224, and 226 form fluid-tight and pressure-tight seals between the gland assembly 30 and the stationary seal ring 14. The O-rings 222, 224 seat in the channels 48, 46 formed in the third surface 42 of the gland assembly 30. The O-ring 226 seats against the second surface 38 and the first annular connecting wall 40 of the gland assembly 30. The stationary seal ring is preferably composed of a carbon or ceramic material.

With reference to FIGS. 6, 11, and 15, a plurality of barrier fluid bores 228 are formed in the stationary seal ring segments 200a and 200b. The bores 228 include a radially extending section 230 that extends radially inwardly from the second outer surface 208 of the stationary seal ring segments and an axial section 232 that communicates with and extends from the radial section 230 to the seal face 18 of the seal ring segments. Barrier fluid from a barrier fluid reservoir, not shown, is introduced to the seal surfaces 18, 20 of the seal rings and the groove 180 formed in the seal face 20 through the bores 228.

One skilled in the art will recognize that the barrier fluid bores are not limited to the number or shape described and illustrated herein. For example, a single barrier fluid bore can be provided. Alternatively, it is possible to provide barrier fluid to the seal faces 18, 20 by means other than a bore formed in the seal rings 14 and 16. For example, the barrier fluid can be introduced to the seal faces from the outer and/or inner diameter of the seal ring segments through spiral pumping grooves or the like. In this manner, the barrier fluid does not necessarily need to be a separate fluid supply but can be the process medium itself.

Likewise, the position and arrangement of the barrier fluid bores is not limited to those specifically disclosed herein, as alternative positions and arrangements are possible to achieve the same results. For example, the barrier fluid bores can be formed in rotary seal ring 16, as well a the stationary seal ring 14, and can extend from the seal faces to any outer surface of the seal rings. In addition, the barrier fluid bore can extend linearly from the seal faces 18, 20 to an outer surface of the seal ring.

Figure 6A:
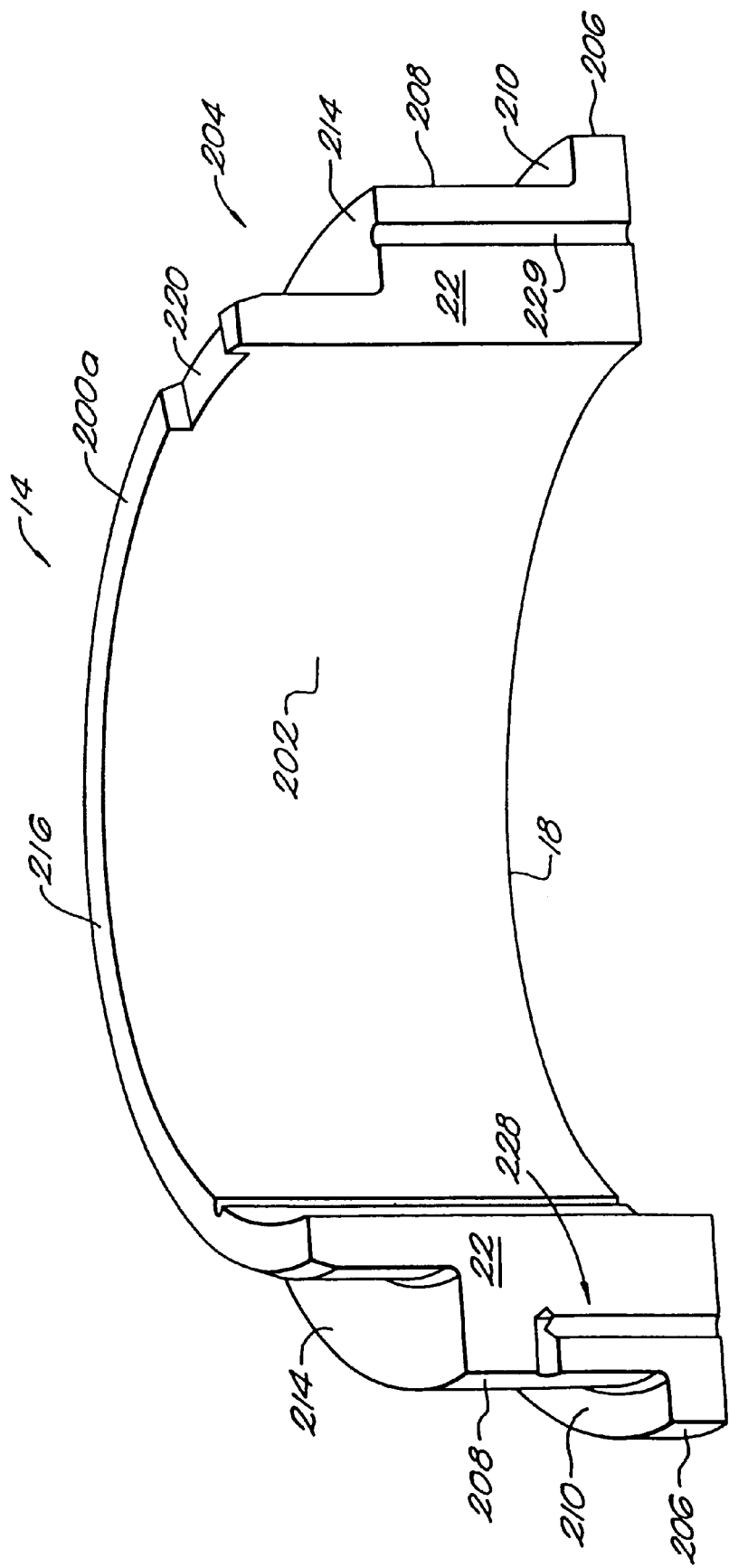
FIG. 6A is a perspective view of one-half of the stationary seal ring of the split mechanical seal of FIG. 1, illustrating an alternative arrangement of the fluid bores formed in the stationary seal ring.

An alternative arrangement of barrier fluid bores is shown in FIG. 6A. In addition to the barrier fluid bores 228, axial fluid bores 229 extend from the seal face 18 to the rear of the stationary seal ring 14, i.e., second annular connecting wall 214. The fluid bores 228 and the axial fluid bores 229 are alternately arranged. in one practice, about the circumference of the stationary seal ring 14. Although this configuration of barrier fluid bores is operable with a barrier gas or liquid, it is particularly suited for applications in which a barrier liquid is introduced to the seal faces 18 and 20. The axial fluid bores 229 transmit the barrier liquid from the seal face 18 to the second annular connecting wall 214 at the rear of the stationary seal ring 14. In this manner, the fluid pressure at the rear of the stationary seal ring is maintained at the fluid pressure at the seal face 18. Accordingly, this particular configuration permits the seal 10 to revert to a conventional balancing arrangement, and, thus operate as a conventional contacting face seal.

As best shown in FIG. 15, each radial section 230 of the barrier fluid bores 228 opens at the second outer surface 208 of the stationary seal ring to provide fluid communication between the bores 228 and a similar axial barrier fluid bore 234 formed in the gland assembly 30.

The bore 234 formed in the gland assembly 30 opens at one end at the outer surface 236 of the gland assembly and at the other end at a section 42b of the third surface 42 of the gland assembly 30 (FIGS. 1 and 2). The O-rings 222 and 224 are positioned in grooves 48 and 46 on either side of section 42b and provide fluid-tight and pressure-tight seals between the stationary seal ring segments 220a, 200b and the gland assembly 30. In this manner, a fluid-tight, pressure-tight annular chamber is formed between the O-rings 222, 224, section 42b of the gland assembly 30, and the second outer surface 208 of the stationary seal ring 14, to retain the barrier fluid within this channel as well as to conduct the fluid into the axial bore 228. Barrier fluid from a barrier fluid reservoir (not shown) is supplied through the gland bore 234 and the annular chamber to each of the stationary seal ring segment bores 228.

The mechanical spring clip 174, in combination with O-ring 172. functions to provide an axial force for resilient supporting the stationary and rotary seal rings 14 and 16 to bias the seal rings such that the stationary and rotating seal surfaces 18 and 20 are biased towards each other. As illustrated in FIGS. 1 and 15, the seal rings 14 and 16 are floatingly and non-rigidly supported in spaced floating relation relative to the rigid walls and faces of the gland and holder assemblies 30, 100. This floating and non-rigid support and spaced relationship permits small radial and axial floating movements of the rotary seal segments 150a, 150b and the stationary seal ring segments 200a, 200b with respect to each other, while still allowing the rotating seal face 20 to follow and to be placed into a sealing relationship with stationary seal ring face 18. Thus, the rotary and stationary seal segments 150a, b and 200a, b are self-aligning as a result of this floating action.

In addition to the mechanical biasing provided by clip springs 174, an additional fluid biasing system is provided in the seal 10 of the present invention. With reference to FIGS. 1, 11 and 15, the fluid biasing system includes a radially extending closing fluid bore 240 that is formed radially through the gland assembly 30 for introducing a closing fluid which is introduced to a rear surface, such as outer surface 204, of the stationary seal ring segments 200a, 200b to provide a closing force on the stationary and rotary seal rings 14, 16. The radially extending closing fluid bore 240 is disposed adjacent and parallel to the barrier fluid bore 234. The closing fluid bore 240 opens at one end at the outer surface 236 of the gland assembly and at the other end at onto section 42a of the third inner gland surface 42 and the second annular connecting wall 44 of the gland assembly 30. A fluid-tight and pressure-tight annular closing fluid chamber 242 is formed between O-rings 224, 226, the outer surface 204 of the stationary seal ring segments 200a and 200b and the inner surface of the gland assembly.

As best illustrated in FIG. 15, closing fluid at a regulated pressure is provided from a closing fluid reservoir (not shown) to the closing fluid chamber 242 through closing fluid bore 240. The closing fluid can be a liquid, a gas, or a combination of both. The closing fluid exerts a fluid closing force $F_{fc}$ on the stationary and rotary seal rings segments. The fluid closing force $F_{fc}$ operates in combination with a mechanical spring closing force $F_{sc}$ to bias the seal faces 18 and 20 towards one another into a sealing relationship. Preferably, the sum of the fluid closing force $F_{fc}$ and the mechanical spring closing force $F_{sc}$ balances the barrier fluid separation force $F_A$ to inhibit over separation of the seal faces 18 and 20 and the potential loss of the seal, e.g., excessive fluid leakage, between seal faces 18 and 20.

The magnitude of the fluid closing force $F_{fc}$ can be adjusted or regulated by controlling the pressure of the closing fluid within the closing fluid chamber 242. The ability to adjust the closing force on the stationary and rotary seal rings segments provides significant advantages. For instance, the magnitude of the closing force can be varied to maintain a sealing relationship between the seal faces 18 and 20 in the event of a change in operating conditions. Also, the magnitude of the fluid closing force can be adjusted to compensate for changes in mechanical spring force due to use of seal components having different tolerances. Consequently, the split mechanical seal 10 in combination with a fluid feedback system can dynamically regulate the fluid seal and/or the gap formed between the seal faces 18, 20 to control the amount of leakage during operation.

A significant advantage of the fluid biasing system is that it provides a simple integrated structure, such as fluid conduits, for externally controlling the amount of separation of the seal faces and regulating the fluid seal formed between the seal faces. Accordingly, this system can operate in combination with the separation force provided by barrier fluid introduced to the seal faces 18, 20 or independent of pressurized fluid contained within the seal 10, to adjust the degree of seal face contact. Hence, the split mechanical seal 10 can regulate or adjust the seal face separation, as well as the fluid seal formed therebetween, over a wide range of operating conditions. This increases the flexibility of the seal and allows the seal to be used in multiple environments.

One skilled in the art will recognize that the seal is not limited to the specific fluid closing system described herein and that alternative fluid closing system arrangements are possible. For example, a single fluid reservoir can be used to supply both barrier fluid to the groove and to supply closing fluid to the outer surface of the stationary seal ring. Alternatively, the process medium can be used as the closing fluid. Furthermore, either the mechanical spring clips 174 or the closing fluid system can be used as the sole source of axial biasing force, eliminating the need for the other axial closing force.

The split mechanical seal 10 of the present invention can include a pressure feedback system (not shown) that regulates either or both of the closing pressure and the pressure of the barrier fluid supplied to the seal to maintain the desired conditions at the seal faces 18, 20 of the seal rings 14, 16. The pressure control system can include pressure sensors mounted within or at the seal to monitor changes in barrier and closing fluid pressure during operation. The pressure sensors can be coupled to a controller or the like in a closed or open feedback system for adjusting the barrier and/or closing fluid pressure in response to pressure variations due to changes in operating conditions. Examples of pressure feedback systems are disclosed in U.S Pat. No. 2,834,619 and U.S. Pat. No. 3,034,797, both of which are incorporated herein by reference.

Alternatively, the pressure feedback system can employ one of the system fluids, such as barrier, process or closing fluid, as a regulator fluid input and regulate either the barrier fluid pressure or closing force based on this regulated input. In doing this, the pressure feedback system can sense a change in pressure between selected fluid pressures and corrects any imbalance. The pressure feedback system accomplishes this correction by connecting the system to a high pressure fluid supply to add fluid to the system to raise the pressure therein or to vent pressure from the system when internal pressure is above a selected value.

Barrier fluid can be introduced to outer surface 204 of the stationary seal ring 14 through barrier fluid gland bore 234, as illustrated in FIGS. 1, 11, and 15. The O-rings 222 and 224, the outer surface 204 of the stationary ring segments, and the inner surface of the gland assembly form, in combination, a fluid-tight, pressure-tight chamber 270. Barrier fluid introduced to the chamber 270 through gland bore 234 exerts a radially inward fluid source $F_{rb}$ on the outer surface 204 of the stationary seal ring segments. The radially inward fluid force $F_{rb}$ acts in combination with the radial inward force provided by the O-rings 222, 224, and 226 and the process medium, as well as a radially inward fluid force $F_{rc}$ provided by the closing fluid within closing fluid chamber 242, to place each of the stationary seal ring segment sealing surfaces 22 into sealing contact with another segment, thereby maintaining a fluid-tight, pressure-tight seal.

In a manner analogous to the rotary seal ring, the radially inward fluid force $F_{rb}$ can be adjusted or varied by controlling and/or regulating the pressure of the barrier fluid in the chamber 270. Likewise, the radially inward fluid force $F_{rc}$ can be adjusted or varied by controlling and/or regulating the pressure of the closing fluid within the closing fluid chamber 242. In this manner, the radially inward force on the stationary seal ring segments, in addition to the rotary seal ring segments, can be adjusted for changes in operating conditions. For example, the radially inward force on the stationary seal ring segments can be increased to inhibit separation of the stationary seal ring segments during negative pressure conditions.

As generally illustrated in FIG. 14. identical ball and socket fastening mechanisms are provided on the free ends of O-rings 128, 170, 172, 222, 224, and 226. At one end, the O-ring narrows into a substantially hemispherical shoulder portion 250 and, adjacent thereto, annular neck portion 252. Immediately adjacent neck portion 252 is substantially spherical head portion 254. In fastening, head portion 254 is inserted into matching spherical socket portion 256 at the other end of the O-ring such that annular collar portion 258 surrounds and captures neck portion 252, and shoulder portion 250 is in intimate contact with annular jacket portion 260. Additionally, although seal 10 and its associated components are depicted as sectional pans, the O-rings 128, 170, 172, 222, 224, and 226 are continuous and complete structures having the above configuration.

In assembly, the rotary seal segments 150a and 150b are mounted about the shaft 12 and mounted in the holder assembly 100 by aligning the alignment bore 134 of the rotary seal ring with axially extending alignment pin 132, which extends from alignment bore 130 of the holder assembly. The O-ring 170 is concentrically disposed about the rotary seal segments 150a and 150b and is further placed in sealing contact with the holder second face 112, rotary seal second outer surface 158, and can contact either holder first wall 118 or rotary seal first wall 160. Likewise, the O-ring 172 is concentrically disposed about the rotary seal segments 150a and 150b and is further placed in sealing contact with the holder fourth face 115, the holder third wall 121, rotary seal fourth outer surface 166, and rotary seal third wall 168. The O-rings 170 and 172 provide an inward radial force sufficient to place the rotary seal surfaces 24 of the seal segment 150a into sealing contact with each of the seal surfaces 24 of the seal segment 150b. The holder segments 34a and 34b are then secured together by tightening screws 146 that are positively maintained in fastener receiving apertures 144. As shown in FIGS. 1 and 15, the rotary seal segments 150a and 150b are spaced from the holder assembly inner surface 108, and are non-rigidly supported therein by O-rings 170 and 172, thereby permitting small radial and axial floating movements of the rotary seal ring 16.

The stationary seal ring segments 200a and 200b are concentrically mounted over shaft 12 and secured together by O-rings 222, 224, and 226. The O-rings 222, 224, and 226 provide a radially inward force to the stationary seal ring outer surface 204 sufficient to place the sealing surfaces 22 of the seal segment 200a into sealing contact with the sealing surfaces 22 of the seal segment 200b.

The gland segments 34a and 34b are concentrically placed about the holder assembly 100, and the stationary and rotary seal rings 14 and 16, and are secured together by screws 90 that are mounted in and positively maintained by fastener-receiving apertures 84 in the gland segments. The screw cannot be unintentionally removed from the seal 10 since they are secured to the gland assembly 30 by the inventive fastener-receiving aperture 84 and screw 90. Additionally, mounting the screws 90 does not necessitate rotating the shaft since the screws 90 can be reached from either side of the gland assembly 30. Alternative seal fastening means known in the art can also be used with the seal of the present invention.

Prior to fully securing the gland assembly 30 to the housing 11. the shaft 15 12, the holder assembly 100, and the stationary and rotary seal rings 14, 16 should be centered within the chamber 102. Examples of suitable centering mechanisms are described in U.S. Pat. No. 5,571,268, which is assigned to the assignee hereof and is incorporated herein by reference.

When the gland assembly 30 and the holder assembly 100 are properly aligned, the gland gasket 80 and the holder gasket 142 are captured in separate gasket grooves 64, 140 formed on opposing seal faces of the gland and holder segments. The double capture configuration allows the seal 10 to withstand higher pressures without degradation of the pressure and fluid seals formed at the segment sealing faces. Additionally, the O-rings 222, 224, and 226 form a pressure-tight and fluid-tight seal between the gland inner surface and the outer surface 204 of the stationary seal ring 14.

After the seal 10 is assembled and mounted to the pump housing 11, the process medium is sealed within a process fluid chamber 300, as shown in FIGS. 1 and 15. The process fluid chamber is defined by the gland inner fourth surface 50 and fifth surface 54, the gland third wall 52, O-rings 170 and 222, the outer surface 106 and the first and second inner surfaces 110, 112 of the holder assembly, first outer surface 156 of the rotary seal ring 16, and the first and second outer surfaces 206, 208 and first connecting wall 210 of the stationary seal ring 14. The ambient medium, typically air, fills an ambient fluid chamber 310, typically sealed from the process chamber 300, that is defined by the stationary and rotary seal ring inner surfaces 152, 202, the fourth wall 169 of the rotary seal ring 16, the O-ring 128, and the shaft 12.

The terms "ambient" and "ambient medium" are intended to include any external environment or medium other than the process environment or process medium.

The stationary and rotating segment seal surfaces 22, 24 are placed in sealing contact with the other segment of the pair by the radial force of the O-rings 170, 172, 222, 224, and 226. The pressure of the process medium within the process chamber 300 exerts an additional radial inward force, proportional to the process fluid pressure, upon the rotary seal ring segment first outer surface 156 and the stationary seal ring segment first and second outer surfaces 206, 208, biasing the segment sealing surfaces 22, 24 together.

The O-ring 128 prevents the seepage of process fluid along the shaft 12 and into the ambient fluid chamber 310. The flat gasket 60 prevents the seepage of process fluid along the housing 11 and the seal 10 interface. The O-rings 170, 172, 222, 224, and 226 prevent process fluid from invading the ambient fluid chamber 310 by way of the holder assembly 100 and the gland assembly 30, respectively.

In operation, barrier fluid is introduced to the groove 180 and the seal faces 18, 20a, 20b through barrier fluid bores 228 in the stationary seal ring 14. The barrier fluid exerts a primarily hydrostatic lifting force on the seal face 18, 20a, and 20b that operates to separate at least a portion of the stationary seal ring face 18 from at least a portion of the rotary seal ring faces 20a and 20b to form a gap therebetween. The barrier fluid fills the gap formed between the seal faces, thereby separating the seal faces 18 and 20 to form a fluid seal between the process medium in the process chamber 300 and the ambient fluid in the ambient fluid chamber 310. The gap is maintained at a predetermined width, or is adjustable, to minimize leakage across the seal faces while concomitantly separating the seal faces to reduce wear.

The effects of the barrier fluid on the seal 10 is twofold. First, the barrier fluid can reduce wear on the seal faces by reducing the amount of direct, frictional contact between the seal face 18 and the seal faces 20a and 20b, thus resulting in a longer life for the seal components. Second, the barrier fluid operates to transfer heat generated by the direct, frictional contact between the seal faces away from the seal faces, resulting in a more even temperature distribution throughout the seal 10 and thus prolonging the useful life of the seal components by reducing thermal stress that the components are subjected to.

Additionally, the split mechanical seal 10 of the present invention provides the requisite flexibility of being operable with different types of barrier fluids, e.g. gases or liquids or combinations thereof. This flexibility is possible because the area of direct, frictional contact between the seal faces can be controlled by adjusting the barrier fluid pressure and the closing fluid pressure, and thus the magnitude of the hydrostatic lifting force, to produce the desired separation gap. Generally. it is desirable for the separation gap to be greater in barrier gas applications than in barrier liquid applications, because of the typically better heat transfer properties of liquids compared with gases. Accordingly, in applications in which a barrier gas is preferred, the separation gap can be adjusted to the appropriate width for the selected barrier gas which will inhibit wear on the seal faces. Similarly, in applications in which a barrier liquid is preferred, the separation gap can be adjusted to the appropriate width for the selected barrier liquid which will inhibit wear on the seal faces.

The seal 10 of the present invention offers the further advantage of being a completely split mechanical seal, and preferably a split mechanical non-contacting face seal, in which a portion of each of the seal components, e.g. the gland assembly, the holder assembly, the stationary and rotary seal rings, and the O-rings, is split. This split seal design facilitates replacement or repair of damaged seal components by permitting installation and removal of the split seal components without necessitating the complete breakdown of the associated equipment, e.g., a pump or the like, and without having to pass the seal over the end of the shaft.

Furthermore, the split configuration of the split mechanical seal 10 of the present invention does not compromise the seal integrity of the seal. The inventive design of the seal 10 is such that radial fluid leakage at the seal surfaces 22, 24, 62, and 138, between each of the split segments 150, 200, 34, and 104 of the stationary and rotary seal rings, the gland assembly, and the holder assembly, respectively, is inhibited. Similarly, fluid leakage across the stationary and rotary seal faces 18, 20a and 20b is inhibited by the combination of axial closing forces applied to the seal rings which function to bias the seal faces towards each another in a sealing relationship, as well as maintain the proper alignment of the seal faces.

During normal operation, the pressure of the process medium in the process fluid chamber 300 is greater than the pressure of the ambient fluid in the ambient fluid chamber 310 (the positive pressure condition), and the process fluid exerts a radially inward force on the outer surfaces 204, 154 of the stationary and rotary seal rings, respectively, and the outer surface 106 of the holder assembly 100, as illustrated in FIGS. 1 and 15. The radially inward force exerted by the process medium assists in holding together the segments of the seal rings and the holder assembly in a fluid sealed relationship.

If the pressure of the process medium in the process fluid chamber 300 falls below the pressure of the ambient fluid in the ambient fluid chamber 310 (the negative pressure condition), the ambient fluid exerts a radially outward force on the inner surfaces 202, 152 of the stationary and rotary seal rings, respectively. If the pressure differential created during this condition is such that the radially outward force is greater the radially inward force applied by the O-rings, the seal ring segments can separate, resulting in leakage across the seal faces.

To prevent this type of leak-age across the seal faces 18, 20, and seal surfaces 22, 24 in the negative pressure condition, the radially outward force on the seal rings from the ambient fluid pressure is counter balanced by the radial inward force provided by the O-rings 222, 224, and 226 on the stationary seal ring segments 200a and 200b and by O-rings 170 and 172 on the rotary seal ring segments 150a and 150b, in combination with the radially inward force exerted by the barrier fluid disposed within the chamber 185 on the outer surface 154 of the rotary seal ring segments. The radially inward fluid force $F_{rr}$ acts in combination with the radial inward force provided by O-rings 170 and 172 to maintain each of the rotary segment sealing surfaces 24 into sealing contact with the other segment during this condition, thereby maintaining a fluid-tight and pressure-tight seal.

During operation, the O-ring 172 acts a pivoting resilient member about which the rotary seal ring 16 can pivot to maintain co-planar alignment and a sealing relationship between the rotary seal ring seal face 18 and the stationary seal ring seal face 20. Thus, coning of the seal faces is prevented and loss of the fluid seal between the seal faces inhibited. Additionally, the presence of the O-ring 172 and the pivoting ability it affords allows for the seal faces 20a and 20b to be radially separated to form concentric seal faces without loss of the fluid seal between seal faces 18 and 2a, b. Accordingly, the pivoting action of the O-ring 172 provides for a resilient pivoting of the rotary seal ring 16 during full operation of the split mechanical seal 10 in both non-contacting and contacting face seal modes, while concomitantly ensuring either consistent co-planar contact between the opposed seal faces.

The fluid biasing system introduces a closing fluid to the outer surface 204 of the stationary seal ring segments 200a, 200b to provide a closing force on the stationary and rotary seal rings 14, 16. Closing fluid at a regulated pressure is provided to the closing fluid chamber 242 through closing fluid bore 240. The closing fluid exerts a fluid closing force $F_{fc}$ on the stationary and rotary seal rings segments. The fluid closing force $F_{fc}$ operates in combination with a mechanical spring closing force $F_{sc}$ to bias the seal faces 18 and 20 towards one another into a sealing relationship. During operation, the sum of the fluid closing force $F_{fc}$ and the mechanical spring closing force $F_{sc}$ balances the barrier fluid separation force $F_A$ to inhibit over separation of the seal faces 18 and 20 and the potential loss of the seal, e.g., excessive fluid leakage, between seal faces 18 and 20.

The fluid biasing system increases the flexibility of the split mechanical seal 10 and allows the seal to be used in multiple environments by providing a simple integrated structure, i.e., fluid conduits, for externally controlling the amount of separation of the seal faces and regulating the fluid seal formed between the seal faces. The system can operate in combination vvith the separation force provided by barrier fluid on the seal faces 18, 20 or independent of pressurized fluid contained within the seal 10 to adjust the degree of seal face contact. Thus, the split mechanical seal 10 can regulate or adjust the seal face separation, as well as the fluid seal formed therebetween, over a wide range of operating conditions.

One skilled in the art will recognize that, although only a single seal configuration is described and illustrated herein, the seal 10 of the present invention can be used in a dual or tandem or plural seal configuration in which multiple seals 10 or seal rings are arranged axially along the shaft.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A split mechanical non-contacting face seal for providing fluid sealing between a housing and a rotating shaft, said seal comprising
    a first seal ring having at least two split seal ring segments and a radially extending first seal face,
    a second seal ring having at least two split seal ring segments and a radially extending second seal face, said first and second seal faces being opposed to one another,
    one of said first seal ring and said second seal ring being connected to said rotating shaft to rotate therewith, the other of said first seal ring and said second seal ring being connected to said housing,
    means for introducing a fluid to said first seal face and said second seal face, and a resilient member positioned about said second seal ring to permit pivoting of said second seal ring about said resilient member to maintain said first and second seal faces in co-planar alignment.

2. The split mechanical seal according to claim 1, further comprising a split gland assembly having at least two gland segments coupled to an outer surface of said first seal ring for connecting said first seal ring to said housing.

3. The split mechanical seal according to claim 2, further comprising at least one split resilient member interposed between said split gland assembly and said outer surface of said first seal ring for resiliently engaging said first seal ring to form a seal therebetween.

4. The split mechanical seal according to claim 1, further comprising a split holder assembly having at least two holder segments coupled to an outer surface of said second seal ring for coupling said second seal ring to said rotating shaft.

5. The split mechanical seal according to claim 4 further comprising at least one split resilient member interposed between said split holder assembly and said outer surface of said second seal ring for resiliently engaging said second seal ring to form a seal therebetween.

6. The split mechanical seal according to claim 1, further comprising
    a split gland assembly having at least two gland segments coupled to an outer surface of said first seal ring for connecting said first seal ring to said housing,
    a second resilient member interposed between said split gland assembly and said outer surface of said first seal ring for resiliently engaging said first seal ring to inhibit radial separation of said seal ring segments of said first seal ring and to form a seal therebetween, and
    a split holder assembly having at least two holder segments coupled to an outer surface of said second seal ring for coupling said second seal ring to said rotating shaft,
    wherein said resilient member is interposed between said split holder assembly and said outer surface of said second seal ring for resiliently engaging said second seal ring to inhibit radial separation of said seal ring segments of said second seal ring and to form a seal therebetween.

7. The split mechanical seal according to claim 6, further comprising a third resilient member interposed between said split holder assembly and said outer surface of said second seal ring for resiliently engaging said second seal ring to inhibit radial separation of said seal ring segments of said second seal ring and to form a seal therebetween.

8. The split mechanical seal according to claim 7, wherein said third resilient member selectively abuts one of said outer surface of said second seal ring and an inner surface of said holder assembly.

9. The split mechanical seal according to claim 1, further comprising fluid introduction means for introducing a closing fluid to a rear surface of said first seal ring to provide a closing force on said first seal ring, said closing force biasing said first and second sealing faces towards one another.

10. The split mechanical seal according to claim 1, wherein said means for introducing a fluid comprises a groove formed in said second seal face.

11. The split mechanical seal according to claim 10, wherein said groove is continuous about said second seal face.

12. The split mechanical seal according to claim 10, wherein said groove is positioned on said second seal face to form two concentric seal faces thereby providing a dual seal on a single seal ring.

13. The split mechanical seal according to claim 10, further comprising means for providing a separation force between said first and second seal faces to cause separation of said at least a portion of said first seal face from at least a portion of said second seal face.

14. The split mechanical seal according to claim 13, wherein said separation force comprises generally primarily a hydrostatic separation force.

15. The split mechanical seal according to claim 1, wherein said means for introducing a fluid to said first and second seal faces comprises a fluid conduit formed through said first seal ring.

16. The split mechanical seal according to claim 15, wherein said fluid conduit extends axially through said first seal ring and has a first end opening onto said first seal face.

17. The split mechanical seal according to claim 1, wherein said means for introducing a fluid to said first and second seal faces comprises
   a continuous, circumferential groove formed in said first seal face, and
   a fluid conduit formed through said second seal ring, said fluid conduit opening onto said second seal face and onto said groove when said seal rings are assembled to provide fluid communication between said fluid conduit and said groove.

18. The split mechanical seal according to claim 1, further comprising means for fluidly retaining together said seal ring segments of said second seal ring in a sealing relationship in a negative pressure condition.

19. The split mechanical seal according to claim 18, wherein said means for fluidly retaining said seal ring segments of said second seal ring in a sealing relationship comprises a fluid conduit formed in said second seal ring for supplying fluid to an outer surface of said second seal ring.

20. The split mechanical seal according to claim 19, wherein said fluid conduit has first and second ends, said first end opening onto said second seal face and being disposed in fluid communication with said means for introducing fluid to said first and second seal faces, and wherein said second end of said fluid conduit opens at said outer surface of said second seal ring.

21. The mechanical seal according to claim 1, wherein said means for introducing a fluid to said first and second seal faces establishes a gap having a selected width between said first and second seal surfaces, said seal further comprising adjustment means for adjusting the gap width during operation.

22. The mechanical seal according to claim 21, wherein said adjustment means comprises fluid introduction means for introducing a closing fluid to a rear surface of said first seal ring to provide a selectively variable closing force on said first seal ring for adjusting the gap width during operation.

23. A split mechanical non-contacting face seal for providing fluid sealing between a housing and a rotating shaft, said seal comprising
   a stationary seal ring having at least two seal ring segments and a radially extending first seal face,
   a rotary seal ring having at least two seal ring segments and a radially extending second seal face, said first and second seal faces being opposed to one another,
   means for introducing a barrier fluid to said first seal face and said second seal face for separating at least a portion of said first seal face from at least a portion of aid second seal face,
   a split gland assembly having at least two gland segments coupled to an outer surface of said stationary seal ring for connecting said stationary seal ring to said housing,
   a first split resilient member interposed between said split gland assembly and said outer surface of said stationary seal ring for resiliently engaging said stationary seal ring to form a seal therebetween,
   a split holder assembly having at least two holder segments coupled to an outer surface of said rotary seal ring for coupling said rotary seal ring to said rotating shaft, and
   a second split resilient member interposed between said split holder assembly and said outer surface of said rotary seal ring for resiliently engaging said rotary seal ring to form a seal therebetween, said second resilient member being positioned to permit pivoting of said rotary seal ring about said second split resilient member to maintain alignment of said first seal face with said second seal face.

24. The split mechanical seal according to claim 23, further comprising means for introducing a closing fluid to a rear surface of said stationary seal ring to provide a closing force on said stationary seal ring, said closing force biasing said first and second sealing faces towards one another.

25. The split mechanical seal according to claim 23, wherein said split gland assembly further comprises a barrier fluid conduit formed therein, said barrier fluid conduit being positioned proximate and in fluid communication with said means for introducing a barrier fluid to said first and second seal faces.

26. The split mechanical seal according to claim 23, wherein said means for introducing a fluid to said first and second seal faces comprises
   a continuous, circumferential groove formed in said second seal face, and
   a fluid conduit formed through said stationary seal ring, said fluid conduit opening onto said first seal face and onto said groove when said seal rings are assembled to provide fluid communication between said fluid conduit and said groove.

27. The split mechanical seal according to claim 23, further comprising means for fluidly retaining together said seal ring segments of said rotary seal ring in a sealing relationship in a negative pressure condition.

28. The split mechanical seal according to claim 23, further comprising a third split resilient member interposed between said split holder assembly and said outer surface of said rotary seal ring for resiliently engaging said rotary seal ring to inhibit radial separation of said seal ring segments of said rotary seal ring and to form a seal therebetween.

29. The split mechanical seal according to claim 28, wherein said third split resilient member selectively abuts one of said outer surface of said rotary seal ring and an inner surface of said holder assembly.

30. The mechanical seal according to claim 23, wherein said means for introducing a fluid to said first and second seal faces establishes a gap having a selected width between said first and second seal surfaces, said seal further comprising adjustment means for adjusting the gap width during operation.

31. The mechanical seal according to claim 30, wherein said adjustment means comprises fluid introduction means for introducing a closing fluid to a rear surface of said stationary seal ring to provide a selectively variable closing force on said stationary seal ring for adjusting the gap width during operation.

32. A split mechanical face seal for providing fluid sealing between a housing and a rotating shaft, said seal comprising
- a first seal ring having at least two split seal ring segments and a radially extending first seal face,
- a second seal ring having at least two split seal ring segments and a radially extending second seal face, said first and second seal faces being opposed to one another,
- one of said first seal ring and said second seal ring being connected to said rotating shaft to rotate therewith, the other of said first seal ring and said second seal ring being connected to said housing,
- means for introducing a fluid to said first seal face and said second seal face, and
- a resilient member positioned about said second seal ring to permit pivoting of said second seal ring about said resilient member to maintain said first and second seal faces in co-planar alignment.

33. The split mechanical seal according to claim 32, further comprising a split gland assembly having at least two gland segments coupled to an outer surface of said first seal ring for connecting said first seal ring to said housing.

34. The split mechanical seal according to claim 33, further comprising at least one split resilient member interposed between said split gland assembly and said outer surface of said first seal ring for resiliently engaging said first seal ring to form a seal therebetween.

35. The split mechanical seal according to claim 32, further comprising a split holder assembly having at least two holder segments coupled to an outer surface of said second seal ring for coupling said second seal ring to said rotating shaft.

36. The split mechanical seal according to claim 35, further comprising at least one split resilient member interposed between said split holder assembly and said outer surface of said second seal ring for resiliently engaging said second seal ring to form a seal therebetween.

37. The split mechanical seal according to claim 32, further comprising
- a split gland assembly having at least two gland segments coupled to an outer surface of said first seal ring for connecting said first seal ring to said housing,
- a second resilient member interposed between said split gland assembly and said outer surface of said first seal ring for resiliently engaging said first seal ring to inhibit radial separation of said seal ring segments of said first seal ring and to form a seal therebetween, and
- a split holder assembly having at least two holder segments coupled to an outer surface of said second seal ring for coupling said second seal ring to said rotating shaft,
- wherein said resilient member is interposed between said split holder assembly and said outer surface of said second seal ring for resiliently engaging said second seal ring to inhibit radial separation of said seal ring segments of said second seal ring and to form a seal therebetween.

38. The split mechanical seal according to claim 37, further comprising a third resilient member interposed between said split holder assembly and said outer surface of said second seal ring for resiliently engaging said second seal ring to inhibit radial separation of said seal ring segments of said second seal ring and to form a seal therebetween.

39. The split mechanical seal according to claim 38, wherein said third resilient member selectively abuts one of said outer surface of said second seal ring and an inner surface of said holder assembly.

40. The split mechanical seal according to claim 32, further comprising fluid introduction means for introducing a closing fluid to a rear surface of said first seal ring to provide a closing force on said first seal ring, said closing force biasing said first and second sealing faces towards one another.

41. The split mechanical seal according to claims 32, wherein said means for introducing a fluid comprises a groove formed in said second seal face.

42. The split mechanical seal according to claim 41, wherein said groove is continuous about said second seal face.

43. The split mechanical seal according to claim 41, wherein said groove is positioned on said seal surface to form two concentric seal faces thereby providing a dual seal on a single seal ring.

44. The split mechanical seal according to claim 41, further comprising means for providing a separation force between said first and second seal faces to cause separation of said at least a portion of said first seal face from at least a portion of said second seal face.

45. The split mechanical seal according to claim 44, wherein said separation force comprises generally primarily a hydrostatic separation force.

46. The split mechanical seal according to claim 32, wherein said means for introducing a fluid to said first and second seal faces comprises a fluid conduit formed through said first seal ring.

47. The split mechanical seal according to claim 32, wherein said means for introducing a fluid to said first and second seal faces comprises
- a continuous, circumferential groove formed in said first seal face, and
- a fluid conduit formed through said second seal ring, said fluid conduit opening onto said second seal face and onto said groove when said seal rings are assembled to provide fluid communication between said fluid conduit and said groove.

48. The split mechanical seal according to claim 32, further comprising means for fluidly retaining together said seal ring segments of said second seal ring in a sealing relationship in a negative pressure condition.

49. The split mechanical seal according to claim 32, wherein said means for fluidly retaining together said seal ring segments comprises a fluid conduit formed in said second seal ring for supplying fluid to an outer surface of said second seal ring.

50. The split mechanical seal according to claim 49, wherein said fluid conduit has first and second ends, said first end opening onto said second seal face and being disposed in fluid communication with said means for introducing fluid to said first and second seal faces, and wherein said second end of said fluid conduit opens at said outer surface of said second seal ring.

51. The mechanical seal according to claim 32, wherein said means for introducing a fluid to said first and second seal faces establishes a gap having a selected width between said first and second seal surfaces, said seal further comprising adjustment means for adjusting the gap width during operation.

52. The mechanical seal according to claim 51, wherein said adjustment means comprises fluid introduction means for introducing a closing fluid to a rear surface of said first seal ring to provide a selectively variable closing force on said first seal ring for adjusting the gap width during operation.

* * * * *